(12) United States Patent
Ito et al.

(10) Patent No.: US 6,615,339 B1
(45) Date of Patent: Sep. 2, 2003

(54) VLIW PROCESSOR ACCEPTING BRANCHING TO ANY INSTRUCTION IN AN INSTRUCTION WORD SET TO BE EXECUTED CONSECUTIVELY

(75) Inventors: Hironobu Ito, Hyogo (JP); Hisakazu Sato, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/484,413

(22) Filed: Jan. 18, 2000

(30) Foreign Application Priority Data

Jul. 19, 1999 (JP) ............................. 11-204908

(51) Int. Cl.⁷ .............................. G06F 9/38; G06F 9/42; G06F 9/30
(52) U.S. Cl. ........................ 712/24; 712/245; 712/237; 712/210
(58) Field of Search ................................ 712/219, 206, 712/24, 25, 211, 213, 233, 237, 239, 245, 210

(56) References Cited

U.S. PATENT DOCUMENTS 5,761,470 A    6/1998  Yoshida ................. 712/210
5,787,303 A *  7/1998  Ishikawa ................ 712/24
6,266,764 B1 * 7/2001  Okamoto ............... 712/206

FOREIGN PATENT DOCUMENTS

JP    10-49371    2/1998
JP    11-7387     1/1999

* cited by examiner

*Primary Examiner*—Daniel H. Pan
(74) *Attorney, Agent, or Firm*—McDermott, Will & Emery

(57) ABSTRACT

A VLIW processor includes an instruction decode unit selecting one of parallel execution and consecutive execution and decoding a plurality of operation instructions included in an instruction word, and a program counter control unit controlling a value of a program counter for providing an indication for the instruction decode unit to provide as no-operation an operation instruction provided in a consecutive execution and executed prior to an operation instruction executed during a consecutive execution when branching to the operation instruction executed during the consecutive execution is introduced. This renders it possible to branch to an operation instruction executed during a consecutive execution and thus provide an enhanced efficiency of instruction-code compression.

16 Claims, 19 Drawing Sheets

FIG. 3A

| OPCODE | X | Ra | Rb | SOURCE |
|---|---|---|---|---|
| 30 | 34 | 31 | 32 | 33 | bits: 0–7, 9, 15, 21, 27

(33)
X=00 → SOURCE = Rc
X=01 → SOURCE = Rc;Rb++
X=11 → SOURCE = Rc;Rb--
X=10 → SOURCE = IMMEDIATE:6

| OPCODE | X' | 0 | Ra | Rb | SOURCE |
|---|---|---|---|---|---|
| 30 | 35 | | 31 | 32 | 33 |

(33)
X'=0 → SOURCE = Rc
X'=1 → SOURCE = IMMEDIATE:6

| OPCODE | 1 | 0 | Ra | Rb | DISPLACEMENT:17 | 37 |
|---|---|---|---|---|---|---|
| 30 | | | 31 | 32 | 36 | |

| OPCODE | 1 | 0 | Ra | Rb | IMMEDIATE:29 | 00 |
|---|---|---|---|---|---|---|
| 30 | | | 31 | 32 | 38 | 37 |

~23 bits: 0–7, 9, 15, 21, 53

FIG. 3E

| OPCODE | 1 | 0 | Ra | Rb | IMMEDIATE:32 |
|---|---|---|---|---|---|
| 30 | | | 31 | 32 | 39 |

~24 bits: 0–7, 9, 15, 21, 53

37: BRANCH TARGET'S OPERATION INSTRUCTION DESIGNATING FIELD

FIG. 13

| CODE: FORMAT | BRANCH TARGET'S OPERATION INSTRUCTION DESIGNATING SIGNAL 99 | EXECUTION ORDER | |
|---|---|---|---|
| | | operation_0 | operation_1 |
| FM=00 : 2ops | 0 | 1st | 1st |
| FM=01 : 2ops | 0 | 1st | 2nd |
| FM=10 : 2ops | 0 | 2nd | 1st |
| FM=11 : 1ops | 0 | 1st | --- |
| FM=00 : 2ops | 1 | 1st | 1st |
| FM=01 : 2ops | 1 | 1st | 1st |
| FM=10 : 2ops | 1 | 1st | 1st |
| FM=11 : 1ops | 1 | 1st | --- |

FIG. 15

| | |
|---|---|
| : ⟋170 | |
| add. l r1 r0 0x4 | |
| add. s r3 r1 r2 ~165 \|\| | nop ~171 |
| sub. s r6 r5 r4 ~164 \|\| | nop ~172 |
| sub. l r9 r8 0x4 | |
| ⋮ | |
| add. l r1 r0 0x8 | |
| add. s r3 r1 r2 \|\| | bra. s #Label1 ~161 |
| ⋮ | |
| add. l r1 r0 0x8 | |
| add. s r6 r4 r5 \|\| | bra. s #Label1 ~162 |
| ⋮ | |
| add. l r1 r0 0x8 | |
| add. s r9 r7 r8 \|\| | bra. s #Label1 ~163 |
| ⋮ | |

FIG. 18

| |
|---|
| ⋮ |
| add. l  r1 r0 0x4 |
| add. s r3 r1 r2 ~165  →  sub. s r6 r5 r4 |
| sub. l  r9 r8 0x4                    ~164 |
| ⋮ |
| add. l  r1 r0 0x8 |
| add. s r3 r1 r2      ||    nop |
| bra. l #Label1~191 |
| ⋮ |
| add. l  r1 r0 0x8 |
| add. s r6 r4 r5      ||    nop |
| bra. l #Label1~192 |
| ⋮ |
| add. l  r1 r0 0x8 |
| add. s r9 r7 r8      ||    nop |
| bra. l #Label1~193 |
| ⋮ |

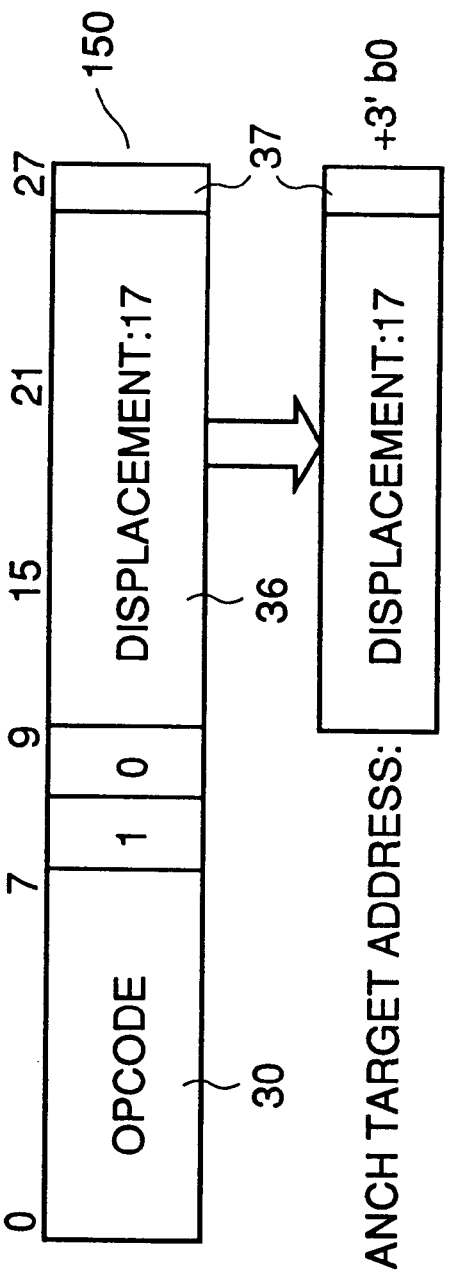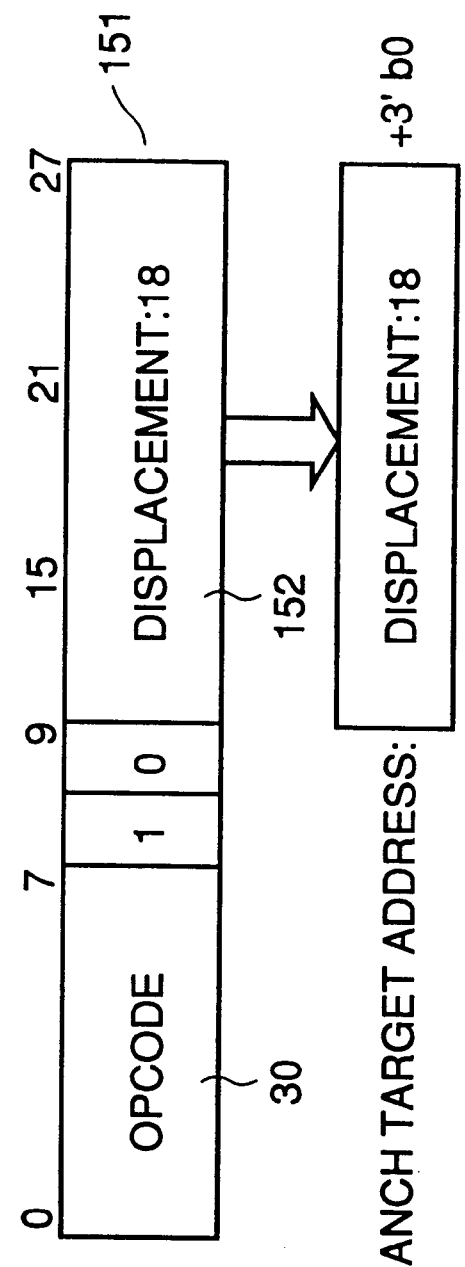
FIG. 19A
FIG. 19B

VLIW PROCESSOR ACCEPTING BRANCHING TO ANY INSTRUCTION IN AN INSTRUCTION WORD SET TO BE EXECUTED CONSECUTIVELY

BACKGROUND OF THE INVENTION

1. Field of the Invention

The present invention relates generally to processors adopting a Very Long Instruction Word (VLIW) architecture executing consecutively or in parallel a plurality of instructions included in a single instruction word, referred to as VLIW processors, and particularly to VLIW processors accepting branching to an instruction executed during a consecutive execution.

2. Description of the Background Art

In recent years, there has been a demand for an enhanced processor performance in various fields such as multi-media processing, high-definition image processing. Devices manufactured by the current Large Scale Integration (LSI) fabrication technology, however, are limited in their operating speed. Accordingly VLIW processors have been noted and increasingly studied and developed.

A VLIW processor allows multiple operation instructions included in a single instruction word to be executed in a single cycle to enhance parallelism to provide an enhanced processor performance. It is known, however, that operations which cannot be executed in parallel cannot be encoded into a single instruction word and accordingly the instruction word has a No Operation (NOP) instruction inserted therein, resulting in a poor coding efficiency. To provide a technique to overcome this disadvantage, U.S. Pat. No. 5,761,470 discloses an invention.

In the data processor disclosed in U.S. Pat. No. 5,761,470, however, a branch target address indicated by a displacement of a branch instruction corresponds to a boundary of an instruction word and is thus constantly required to be the first operation instruction in the instruction word (an instruction prepared at a boundary of an instruction word). Thus an operation instruction immediately preceding a branch target and an operation instruction of the branch target cannot be encoded in a single instruction word and must thus be encoded in two instruction words with a NOP instruction buried between the two operation instructions. Thus the conventional data processor has a poor efficiency of instruction-code compression.

SUMMARY OF THE INVENTION

One object of the present invention is to provide a VLIW processor accepting branching to an operation instruction executed during a consecutive execution.

Another object of the present invention is to provide a VLIW processor capable of reducing the number of inserted no-operations to provide an enhanced efficiency of instruction-code compression.

Still another object of the present invention is to provide a VLIW processor capable of reducing a latency introduced when an exception or an interruption occurs.

Still another object of the present invention is to provide a VLIW processor capable of providing an enhanced program debug efficiency.

Still another object of the present invention is to provide a VLIW processor capable of reducing an instruction execution cycle to provide rapid processing.

The VLIW processor in an aspect of the present invention includes an instruction decode unit selecting one of parallel execution and consecutive execution and decoding a plurality of operation instructions included in an instruction word, and an execution unit using a result of decoding a plurality of operation instructions from the instruction decode unit to execute the plurality of operation instructions, wherein the execution unit includes a program counter control unit controlling a value of a program counter and providing an indication for the instruction decode unit to provide as no-operation an operation instruction provided in a consecutive execution and executed prior to an operation instruction executed during an consecutive execution when branching to the operation instruction executed during the consecutive execution is introduced.

The program counter control unit providing an indication for the instruction decode unit to provide as no-operation an operation instruction provided in a consecutive execution and executed prior to an operation instruction executed during an consecutive execution when branching to the operation instruction executed during the consecutive execution is introduced, allows branching to the operation instruction executed during the consecutive execution and can thus provide an enhanced efficiency of instruction-code compression.

The VLIW processor in another aspect of the present invention includes an instruction decode unit, a memory unit and an integer operation unit, wherein an instruction word includes a plurality of operation instruction fields, a branch target's operation instruction designating field and a format field, the memory unit includes an operation instruction designating register receiving the branch target's operation instruction designating field, the instruction decode unit includes a format field decoder receiving the format field, a plurality of instruction decoders receiving the plurality of operation instruction fields, respectively, and a plurality of output control units receiving a decode result from the format field decoder, a value of the operation instruction designating register and a decode result from each of the instruction decoders, and also connected to the memory unit or the integer operation unit.

The plurality of output control units receiving a decode result from the format field decoder, a value of the operation instruction designating register and a decode result from each of the instruction decoders, and also connected to the memory unit or the integer operation unit, allows branching to an operation instruction executed during a consecutive execution and can thus provide an enhanced efficiency of instruction-code compression.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A–3E represent an operation instruction code in detail.

FIG. 13 represents a content of a process with respect to a decode result from an FM decoder 140.

FIG. 15 represents a program after it is encoded so that a conventional VLIW processor can execute it, with a branch displacement W of no more than 1 Mbyte.

FIG. 18 represents a program after it is encoded so that the VLIW processor of the first embodiment can execute it, with branch displacement W larger than 1 Mbyte and no larger than 2 Mbytes.

FIGS. 19A and 19B represent a branch instruction of a short-type operation instruction format executed by a VLIW processor of a fifth embodiment of the present invention.

DESCRIPTION OF THE PREFERRED EMBODIMENTS

First Embodiment

Figures 1A, 1B:
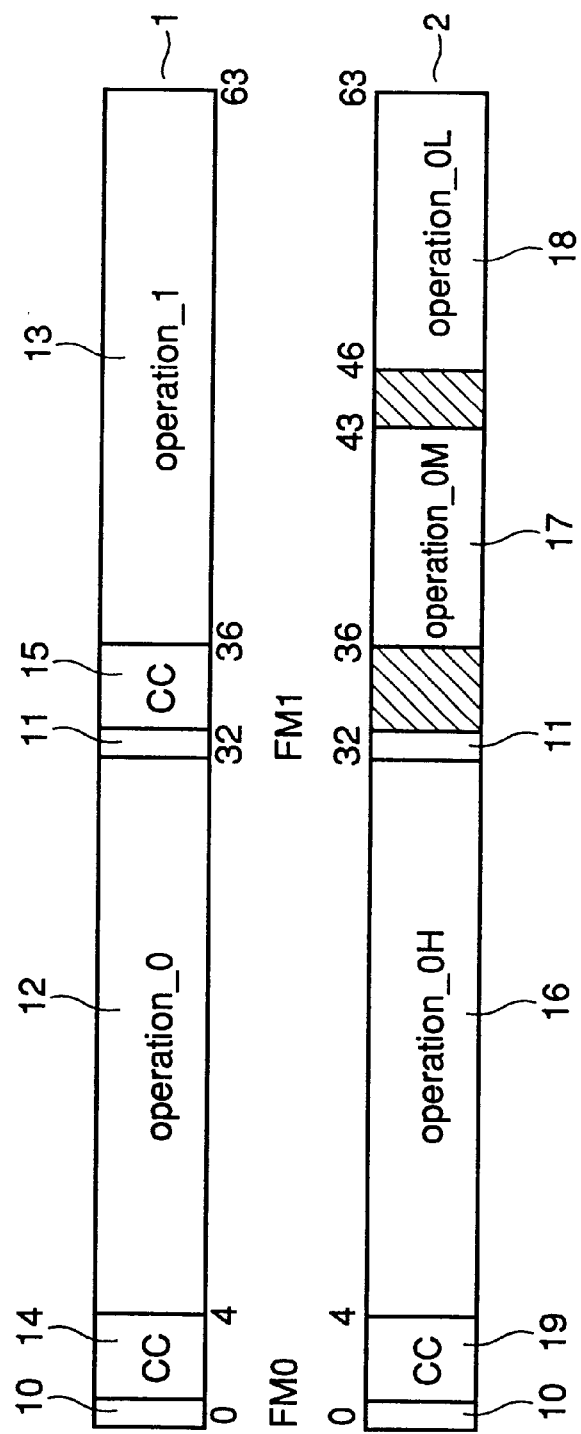
FIGS. 1A and 1B represent instruction formats used in a VLIW processor of a first embodiment of the present invention.

FIGS. 1A and 1B are diagrams for illustrating instruction formats used in a VLIW processor of a first embodiment. Two types of formats, i.e., the instruction formats shown in FIGS. 1A and 1B are prepared as the instruction formats in the present embodiment.

An instruction format 1 shown in FIG. 1A is an instruction format for double operation instructions, including two format fields (FM) 10, 11, two operation instruction fields (operation #0, operation #1) 12, 13, and two execution condition fields 14, 15 belonging to operation instruction fields 12, 13, respectively.

An instruction format 2 shown in FIG. 1B is an instruction format for a single operation instruction, including two format fields 10, 11, three operation instruction fields (operation #0H, operation #0M, operation #0L) 16, 17, 18 and an execution condition field 19 belonging to operation instruction fields 16, 17, 18.

It should be noted that the VLIW processor of the present embodiment is provided with a fixed instruction length of eight bytes (64 bits) and the FIG. 1A instruction format for double operation instructions and the FIG. 1B instruction format for a single operation instruction each have a total length of eight bytes.

In the FIG. 1A instruction format 1, two operation instruction fields 12, 13 each designate a single operation instruction code of a short-type format of 28 bits. In the FIG. 1B instruction format 2, three operation instruction fields 16, 17, 18 designate a single operation instruction code of a long-type format of 54 bits.

Figure 2:
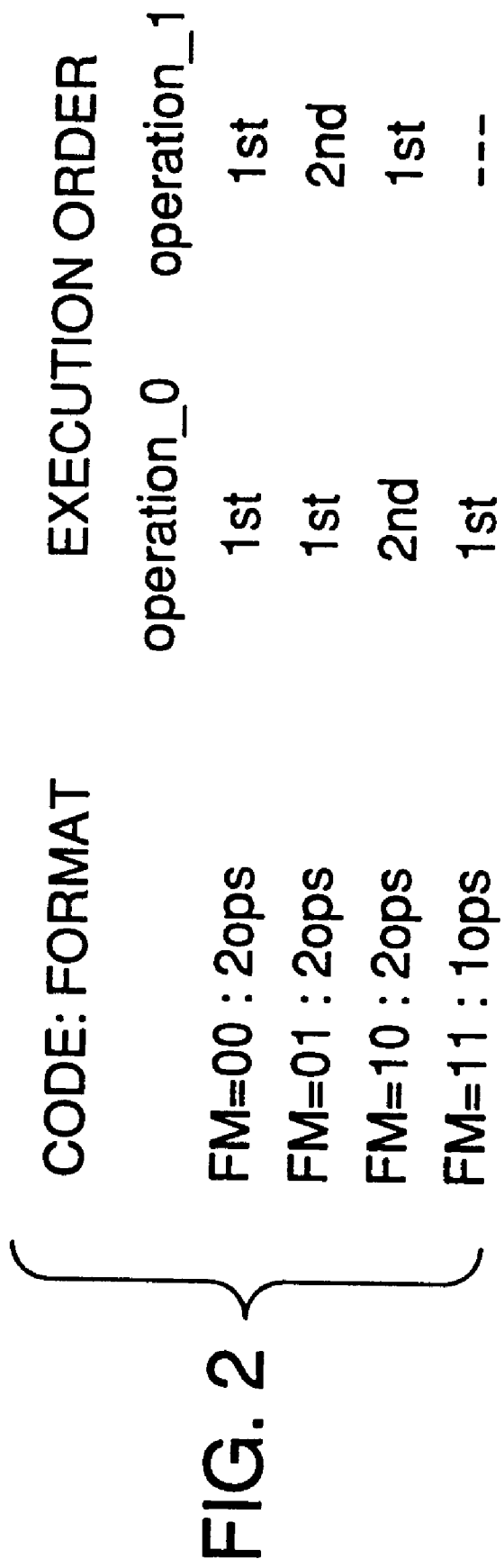
FIG. 2 represents a content of a format field.

FIG. 2 represents a content of format fields 10, 11 shown in FIGS. 1A and 1B. It should be noted that format fields 10, 11 are each a 2-bit field, indicative of four statuses. In FIG. 2, "FM" indicates the two bits of format field 10, 11, "1ops" indicates a single operation instruction, "2ops" indicates double operation instructions, "1st" indicates that the operation with the indication is the first operation to be executed, and "2nd" indicates that the operation with the indication is the second operation to be executed. Furthermore, "- - -" indicates that the operation with the indication does not exist.

In addition to distinguishing between instruction formats 1 and 2, format fields 10, 11 designate the execution order of the operations of double operation instructions. Designating an execution order of operations herein includes designating it when two operations are consecutively executed, as shown in FIG. 2, as well as designating it when two operations are executed in parallel. "Consecutive execution" means that instructions are executed consecutively one by one and that a result of operating an instruction to be first executed is reflected in an instruction to be subsequently executed.

For example, a format field "FM" having a value of "00" indicates double operation instructions, indicating that "operation #0" designated in operation instruction field 12 and "operation #1" designated in operation instruction field 13 are executed simultaneously. Since "operation #0" and "operation #1" are executed simultaneously, software (a compiler, for example) is required to ensure that their respective operands do not conflict with each other.

Furthermore, a format field "FM" having a value of "01" indicates double operation instructions, indicating that "operation #0" designated in operation instruction field 12 is initially executed and "operation #1" designated in operation instruction field 13 is then executed. A format field "FM" having a value of "10" indicates double operation instructions, indicating that "operation #1" designated in operation instruction field 13 is initially executed and "operation #0" designated in operation instruction field 12 is then executed. When a format field "FM" has the value of "01" or "10", hardware is required to ensure that "operation #0" and "operation #1" are consecutively executed.

Furthermore, the VLIW processor of the present embodiment has, as will be described hereinafter, a scheme so that when branching to an operation instruction to be executed during a consecutive execution is introduced, an operation instruction in an instruction word of the branch target that is designated to be executed prior to the operation instruction of the branch target is rendered no-operation and executed accordingly. Thus the operation instruction in the instruction word that is designated to be executed prior to the operation instruction of the branch target is not executed and branching to the operation instruction to be executed during the consecutive execution is introduced properly.

For example, in consecutively executing double operation instructions with an "FM" value of "01", when branching to the operation instruction to be later executed or "operation #1" is introduced, operation instruction "operation #0" designated to be executed prior to the operation instruction of a branch target is rendered no-operation and only operation instruction "operation #1" is executed.

FIGS. 3A–3E illustrate an operation instruction code in detail.

FIG. 3A shows a short-type operation instruction format 20 including a field 30 designating an operation content or an opcode, two fields 31, 32 designating a register number, a field 33 designating a register number or an immediate of six bits in length, and a field 34 designating whether field 33 indicates a register number or an immediate. As shown in FIG. 3A, when field 34 has a value X of "00", "01" or "11" then field 33 indicates a register number, and when field 34 has a value X of "10" then field 33 indicates an immediate. Operation instruction format 20 is used in a memory access operation via indirect register addressing. It should be noted that "Rb++" and "Rb−−" indicate addressing modes in the indirect register addressing. The former indicates an indirect register mode with a post increment and the latter indicates an indirect register mode with a post decrement.

FIG. 3B shows a short-type operation instruction format 21 including a field 30 designating an operation content, two fields 31, 32 designating a register number, a field 33 designating a register number or an immediate of six bits in length, and a field 35 designating whether field 33 indicates a register number or an immediate. As shown in FIG. 3B, if field 35 has a value X' of "0" then field 33 indicates a register number, and if field 35 has a value X' of"1" then field 33 indicates an immediate. Operation instruction format 21 is used in an arithmetic, logic, shift or bit operation.

FIG. 3C shows a short-type operation instruction format 22 including a field 33 designating an operation content, a 17-bit-length displacement field 36 directly designating an address of an instruction word of a branch target, and a branch target's operation instruction designating field 37 designating when an operation instruction of the branch target is executed according to the execution order of the instructions in the instruction word. Branch target's operation instruction designating field 37 of "0" indicates that a branch target is the first operation instruction to be executed and branch target's operation instruction designating field 37 of "1" indicates that a branch target is the second operation instruction to be executed. Operation instruction format 22 is used in conjunction with a branch instruction or a subroutine branch instruction falling in a range in which a branch displacement designated by displacement field 36 can be designated with 17 bits. It should be noted that with the VLIW processor of the present embodiment, having a fixed, 8-byte instruction length, an instruction address constantly has the least three significant bits of "0", allowing an address space of 17+3=20 bits, i.e., a branch displacement up to 1 Mbyte to be designated.

FIG. 3D shows a long-type operation instruction format 23 including a field 30 designating an operation content, two fields 31, 32 designating a register number, a field 38 designating a 29-bit-length immediate or address, and a branch operation instruction designating field 37 designating whether an operation instruction of a branch target is executed during a consecutive execution. Operation instruction format 23 is used in conjunction with a branch instruction for larger branch displacements, an instruction to branch to an absolute address, and the like. It should be noted that with the VLIW processor of the present embodiment, having a fixed, 8-byte instruction length, an instruction address constantly has the least three significant bits of "0", allowing an address space of 29+3=32 bits, i.e., a branch displacement up to 4 Gbytes to be designated.

FIG. 3E shows a long-type operation instruction format 24 including a field 30 designating an operation content, two fields 31, 32 designating a register number, and a field 39 designating an immediate of 32 bits in length. Operation instruction format 24 is used, e.g., in conjunction with complicated arithmetic operations, arithmetic operations on large immediates, memory access via indirect register addressing with a large displacement, and the like.

Figure 4B:
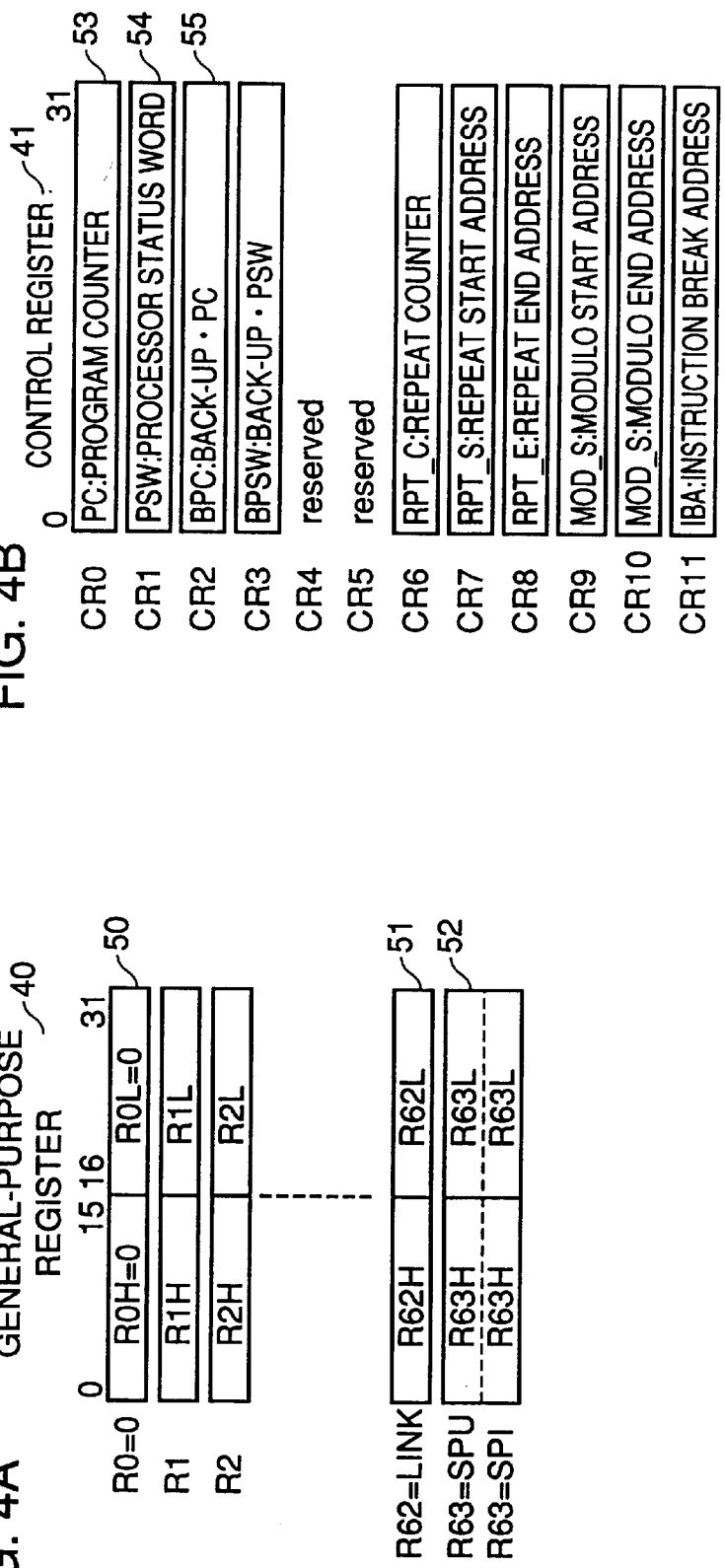
FIGS. 4A–4C represent a register group used in the VLIW processor of the first embodiment of the present invention.
Figure 4A:
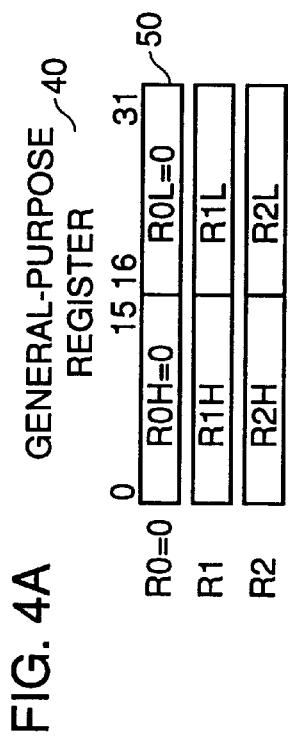
Figure 4C:
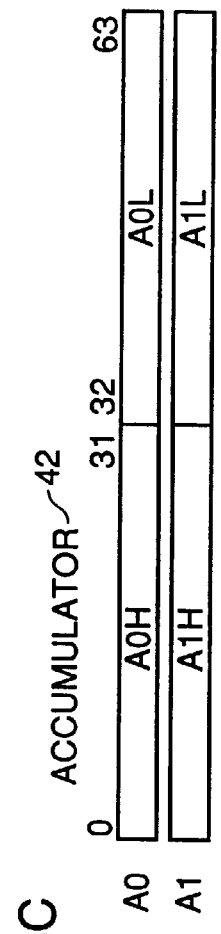

FIGS. 4A–4C illustrate a register group used in the VLIW processor of the present embodiment. The register group includes 64 general-purpose registers (R0–R63) 40 of 32 bits in length, 12 control registers (CR0–CR11) 41 of 32 bits in length, and two accumulators (A0, A1) 42 of 64 bits in length. In general-purpose register R0 (50) any written value is ignored. When general-purpose register R0 (50) is read it constantly outputs "0". General-purpose register R62 (51) is a link register in which a return address from a subroutine is set. General-purpose register R63 (52) is a stack pointer, with a stack pointer for the user (SPU) and a stack pointer for interruption process switched depending on the mode. Control register 41 includes a program counter (PC) 53, a processor status word (PSW) 54, and various types of dedicated registers.

Figure 5:
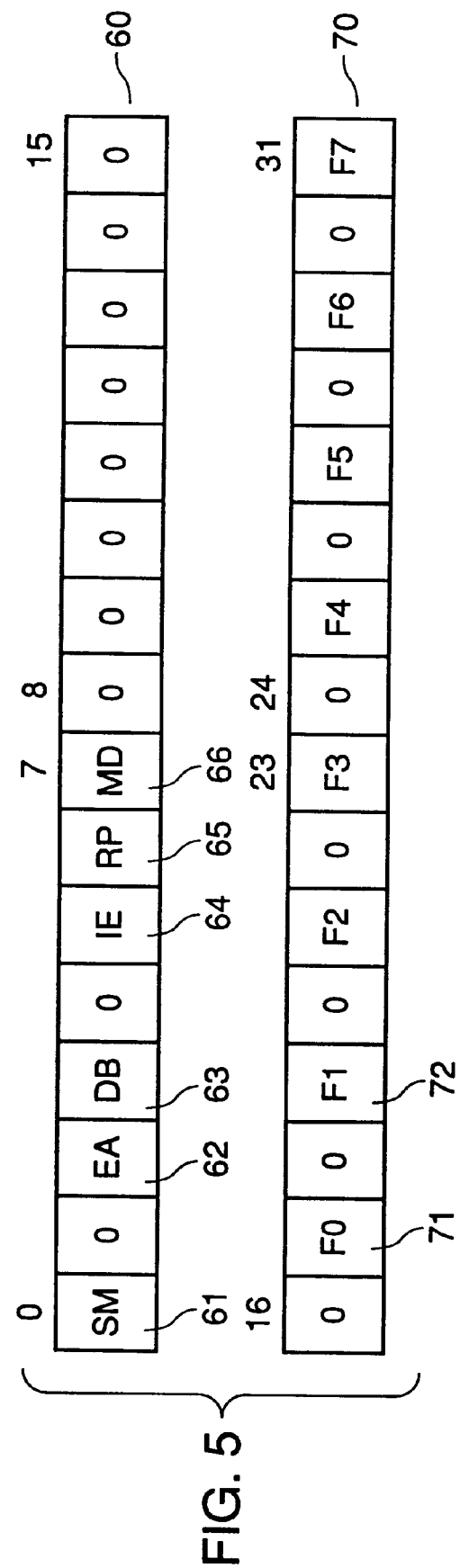
FIG. 5 represents a processor status word in detail.

FIG. 5 illustrates processor status word (PSW) 54 in detail. In the PSW 54's most 16 significant bits are allocated an SM field 61 for switching the stack pointers, an EA field 62 indicative of detection of a software debugger trap (SDBT), a DB field 63 designating a permission to provide the SDBT, an IE field 64 designating a permission to provide an interruption, an RP field 65 designating a permission to provide a repeat operation, and an MD field 66 designating a permission to provide a modulo-addressing.

In the PSW 54's least 16 significant bits a flag field is allocated. In a flag field 70 are allocated eight flags, among which an F0 flag 71 and an F1 flag 72 designate the validity/invalidity of an operation and the other flags have their respective values varying depending on a result of a comparison, a result of an arithmetic operation, and the like. The PSW 54 value can be referred to, varied and the like via a control register access instruction.

Figure 6:
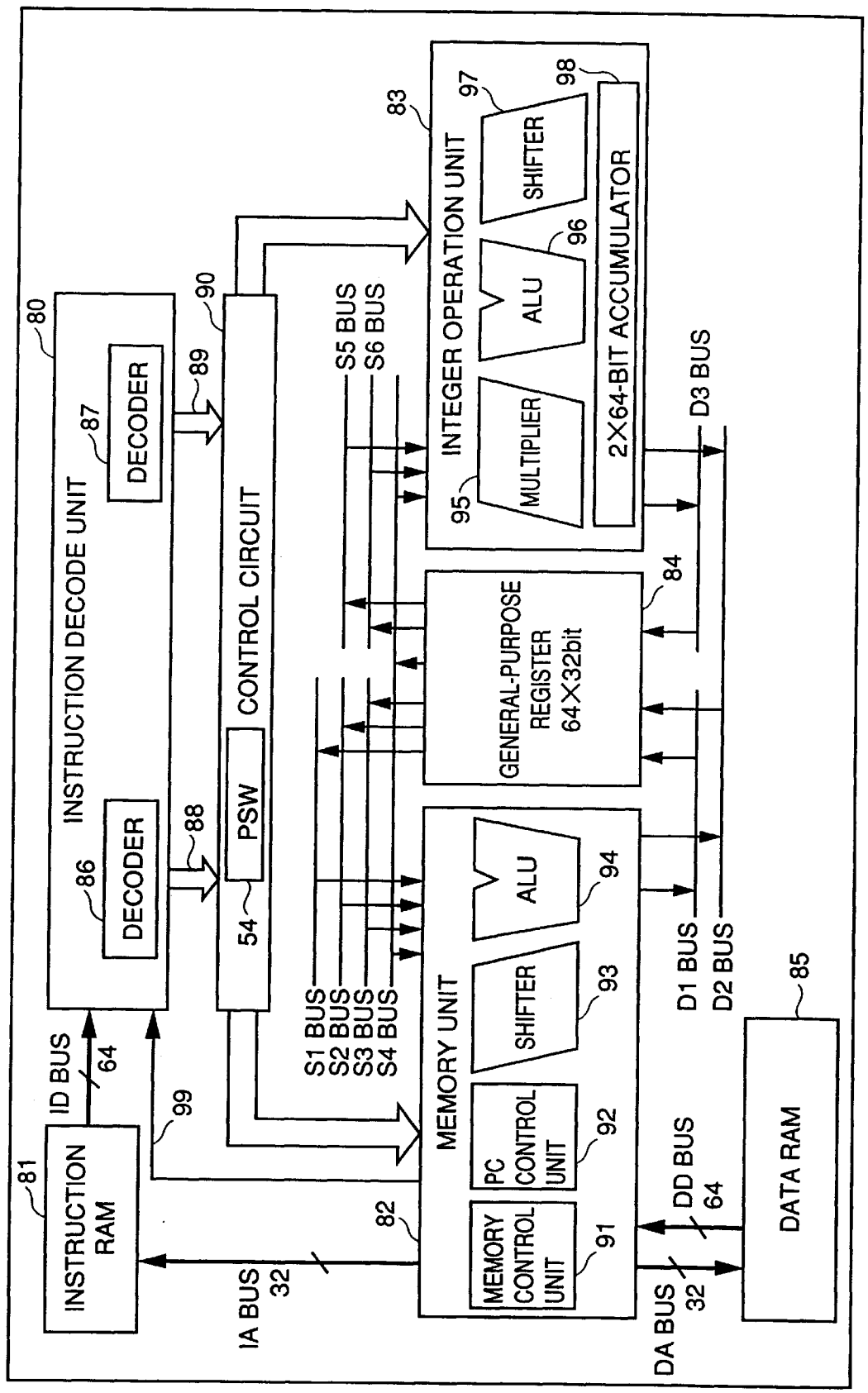
FIG. 6 is a block diagram showing a schematic configuration of the VLIW processor of the first embodiment of the present invention.

FIG. 6 is a block diagram showing a schematic configuration of the VLIW processor of the present embodiment. The VLIW processor includes an instruction random access memory (RAM) 81 storing a 64-bit-width instruction code, an instruction decode unit 80 decoding an instruction code received from instruction RAM 81 via a 64-bit-width ID bus, a memory unit 82 calculating an address in fetching an instruction word, reading an operand and the like, an integer operation unit 83 providing logical, shift and other operations, a general-purpose register 84 of 32 bits times 64 words, a data RAM 85 for data storage, and a control unit 90 controlling memory unit 82 and integer operation unit 83 depending on the decode result from instruction decode unit 80 and the PSW 54 content.

Instruction decode unit 80 includes instruction decoders 86, 87 decoding an instruction code. Depending on the decode results from instruction decoders 86, 87 and a branch target's operation instruction designating signal 99 from memory unit 82, instruction decode unit 80 produces and outputs control signals 88, 89 to control circuit 90. Branch target's operation instruction designating signal 99 will be described in detail hereinafter.

Control circuit 90 includes PSW 54 and it controls memory unit 82 and integer operation unit 83 depending on the decode result from instruction decode unit 80 and the PSW 54 content.

Memory unit 82 includes a program counter (PC) control unit 92 calculating and outputting a PC value, memory control unit 91 controlling instruction RAM 81 and data RAM 85, a shifter 93, and an arithmetic logic unit (ALU) 94. If an instruction to be executed is not a branch instruction, for each execution thereof PC control unit 92 adds "8" to a PC value. If an instruction to be executed is a branch instruction, PC control unit 92, e.g., adds a branch displacement to a PC value or provides a calculation in accordance with an addressing mode designated depending on an operation, to calculate a PC value corresponding to an instruction of a branch target.

Memory control unit 91 outputs a PC value calculated by PC control unit 92 to instruction RAM 81 via a 32-bit-width IA bus to cause instruction RAM 81 to output an instruction code. Memory control unit 91 also outputs an address to data RAM 85 via a 32-bit-width DA bus and accesses the data required for executing an instruction via a 64-bit-width DD bus.

ALU 94 provides an arithmetic logic operation performed on data of no more than three words output from general-purpose register 84 via 32-bit-width S1, S2 and S3 buses, and outputs the result of the operation to general-purpose register 84 via a 32-bit-width Dl bus. Shifter 93 provides a shift operation performed on data received via the S1, S2 and S3 buses and outputs the result of the operation to general-purpose register 84 via the D1 bus.

Integer operation unit 83 includes a multiplier 95, an ALU 96, a shifter 97, and two 64-bit accumulators 98. Multiplier 95 provides a multiplication using data of no more than three words transferred from general-purpose register 84 via 32-bit-width S4, S5 and S6 buses, and outputs the result of the operation to general-purpose register 84 via 32-bit-width D2 and D3 buses.

ALU 96 provides an arithmetic logic operation performed on data of no more than three words transferred from general-purpose register 84 via the S4, S5 and S6 buses, and outputs the result of the operation to general-purpose register 84 via the D3 bus. Shifter 97 provides a shift operation performed on data transferred from general-purpose register 84 via the S4, S5 and S6 buses and outputs the result of the operation to general-purpose register 84 via the D3 bus. Accumulator 98 provides and holds accumulative addition or subtraction of multiplication results provided by multiplier 95.

Figure 7:
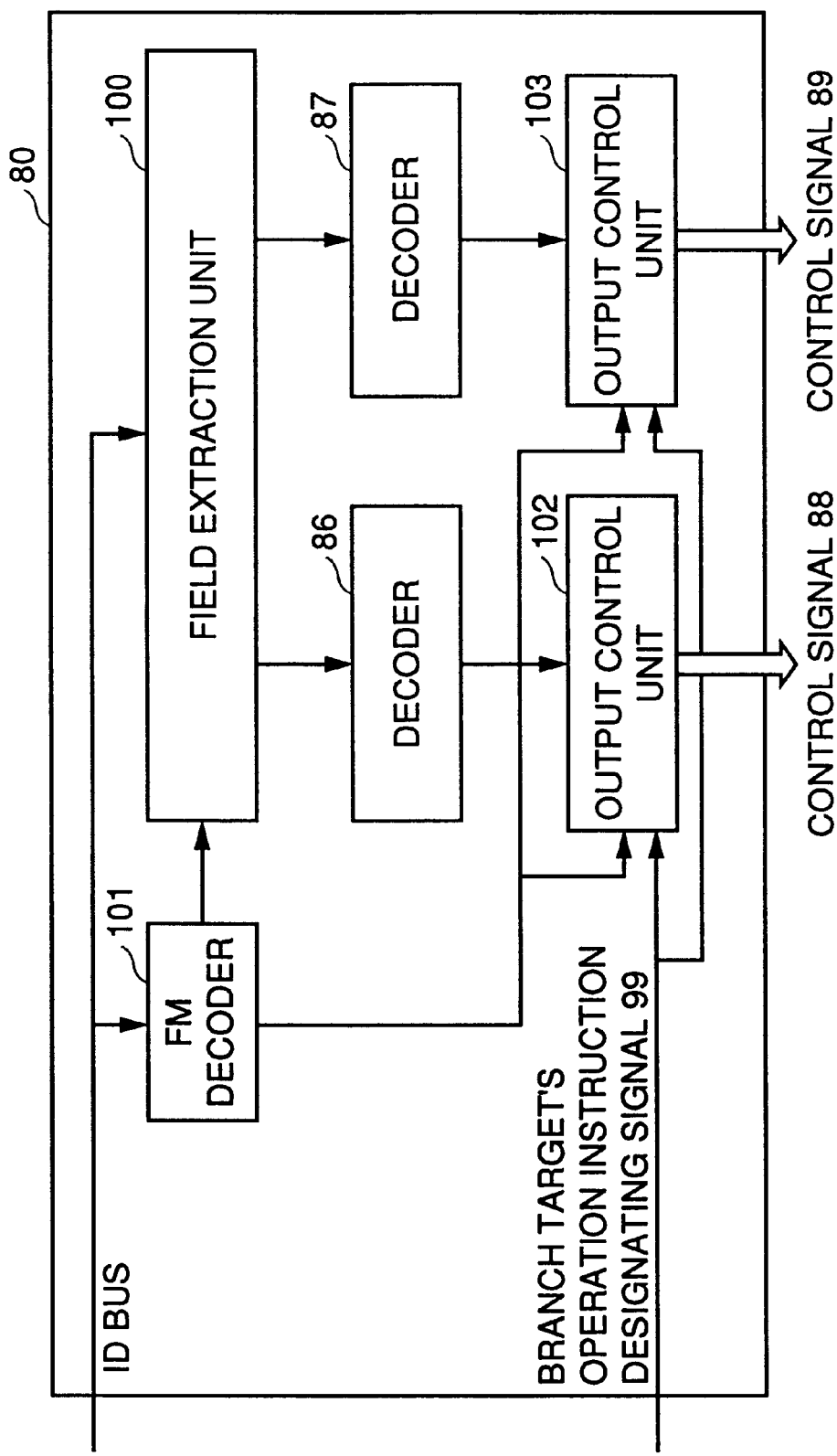
FIG. 7 represents an instruction decode unit 80 in further detail.

FIG. 7 shows instruction decode unit 80 further in detail. Instruction decode unit 80 includes a field extraction unit 100 extracting an operation instruction field, an FM decoder 101 decoding a format field, instruction decoders 86, 87 decoding an operation instruction field extracted by field extraction unit 100, and output control units 102, 103 producing and outputting control signals output to control circuit 90.

Field extraction unit 100 extracts operation instruction fields 12 and 13 or operation instruction fields 16, 17 and 18 from a 64-bit-width instruction code received via an ID bus, and outputs the extracted, operation instruction fields to instruction decoders 86 and 87. In the first cycle of instruction-word decoding, field extraction unit 100 constantly outputs operation instruction field 12 or operation instruction fields 16, 17 and 18 to instruction decoder 86 and operation instruction field 13 to instruction decoder 87. If a decode result from FM decoder 101 is a consecutive execution, then in the first cycle of instruction-word decoding a decoder (not shown) determines the instruction decoder that is to process an operation instruction corresponding to the second operation instruction field to be executed.

In the second cycle of instruction-word decoding, field extraction unit 100 uses a decision made by the decoder (not shown) to output to instruction decoder 86 or 87 the second operation instruction to be executed. If the second operation instruction to be executed can be executed by either one execution unit (of memory unit 86 and integer operation unit 83), field extraction unit 100 outputs it to instruction decoder 86. For example, For a consecutive execution with an "FM" value of "10", with operation instruction fields 12 and 13 both designating operation instructions executable only by integer operation unit 83, field extraction unit 100 operates as described below:

In the first cycle of instruction-word decoding, operation instruction field 13 is output to instruction decoder 87 and decoded therein and operation instruction field 12 is output to a decoder (not shown) and decoded therein. In the second cycle of instruction-word decoding, operation instruction field 12 is output to instruction decoder 87, depending on the decision made by the decoder (not shown). It should be noted that instruction decoder 86 also receives operation instruction field 12 in the first cycle and operation instruction field 13 in the second cycle. Owing to a process provided by output control units 102 and 103, as will be described later, however, the decode results from instruction decoder 86, corresponding to the execution unit, or memory unit 82, that does not execute an operation instruction for each cycle of an consecutive execution, are ignored.

Instruction decoder 86 corresponds to memory unit 82 and it decodes an operation instruction code of a short-type operation instruction format or a long-type operation instruction format extracted by field extraction unit 100. Instruction decoder 87 corresponds to integer operation unit 83 and it decodes an operation instruction code of a short-type operation instruction format extracted by field extraction unit 100

Output control unit 102 uses a decode result from instruction decoder 86, a decode result from FM decoder 101 and branch target's operation instruction designating signal 99 from memory unit 82 to output to control circuit 90 a control signal provided to perform either one of a branch operation, a non-branch operation adding "8" to the current PC value and no-operation, a control signal provided to perform either one of an integer operation and no-operation, and a control signal provided to perform either one of a memory access operation and no-operation. Output control unit 103 uses a decode result from instruction decoder 87, a decode result from FM decoder 101 and branch target's operation instruction designating signal 99 from memory unit 82 to output to control circuit 90 a control signal provided to perform either one of an integer operation and no-operation.

Output control units 102 and 103 uses a decode result from FM decoder 101 to control a timing at which each of the above control signals is output. For parallel execution of double operation instructions or a single operation instruction, instruction decoders 86 and 87 have their decode results output on control signals 88 and 89, respectively, in a single cycle, although for a single operation instruction, output control unit 103 outputs control signal 89 indicative of no-operation.

For consecutive execution of double operation instructions, output control units 102 and 103 output decode results received from instruction decoders 86 and 87, respectively, in two cycles. More specifically, in the first cycle, output control unit 102 or 103 corresponding to instruction decoder 86 or 87 having decoded the first operation instruction field to be executed, outputs the decode result on control signal 88 or 89. In the second cycle, output control unit 102 or 103 corresponding to instruction decoder 86 or 87 having decoded the second operation instruction field to be executed, outputs the decode result on control signal 86 or 87.

In each cycle, output control unit 102 or 103 corresponding to instruction decoder 86 or 87 having decoded an operation instruction field which is not executed in the cycle, ignores a received decode result and outputs a control signal indicative of no-operation. In consecutive execution of double operation instructions, FM decoder 101 decodes a format field and determines and indicates which instruction decoder should decode an operation instruction field to be executed in the first cycle. Furthermore the decoder (not shown) predecodes an operation instruction field to be executed in the second cycle and determines and indicates which instruction decoder should decode the operation instruction field to be executed in the second cycle.

Assume that instruction decoders 86 and 87 decode an instruction word with format fields 10 and 11 having a value of "01", operation instruction field 12 designating a memory access operation in memory unit 82, and operation instruction field 13 designating an integer operation in integer operation unit 83. Field extraction unit 100 extracts each field and outputs format fields 10 and 11 to FM decoder 101, operation instruction field 12 to instruction decoder 86 and operation instruction field 13 to instruction decoder 87.

Since FM decoder 101 provides a decode result indicative of consecutive execution of double operation instructions, output control units 102 and 103 divide a process to provide it in two cycles. FM decoder 101 also provides a decode result indicating that operation instruction field 12 is to be executed in the first cycle and operation instruction field 13 is to be executed in the second cycle. Thus, in the first cycle, instruction decoder 86 decodes operation instruction field 12 and the decode result is output on control signal 88 via output control unit 102 while output control unit 103 outputs control signal 89 indicative of no-operation. In the second cycle, instruction decoder 87 decodes operation instruction field 13 and the decode result is output on control signal 89 via output control unit 103 while output control unit 102 outputs control signal 88 indicative of no-operation.

Output control units 102 and 103 also responds to branch target's operation instruction designating signal 99 by controlling the control signals 88 and 89 contents output for a consecutive execution. When branch target's operation instruction designating signal 99 is "1" or branching to the second operation instruction to be executed in a consecutive execution is introduced, output control unit 102 or 103 ignores a decode result of an operation instruction to be executed prior to the operation instruction of the branch target, i.e., the first operation instruction to be executed in the consecutive execution, and outputs control signal 88 or 89 indicative of no-operation.

Assume there is an instruction word with format fields 10 and 11 having a value of "01", operation instruction field 12 designating a memory access operation in memory unit 82, and operation instruction field 13 designating an integer operation in integer operation unit 83 and that an instruction to branch to the integer operation in the instruction word has been executed. While the instruction word itself is the same as that described previously, branch target's operation instruction designating signal 99 is "1" and output control unit 102 thus in the first cycle ignores a decode result of operation instruction field 12, or the memory access operation to be executed prior to the integer operation corresponding to the operation instruction of the branch target, output from instruction decoder 86 and outputs control signal 88 indicative of no-operation. Output control unit 103 in the second cycle provides a normal process, i.e., outputs on control signal 89 a decode result of operation instruction field 13, or the integer operation corresponding to the operation instruction of the branch target, output from instruction decoder 87. Thus the integer operation instruction is the only operation instruction executed in the instruction word of the branch target and branching to the integer operation instruction is properly introduced.

Output control units 102 and 103 outputs control signals 88 and 89 to control circuit 90. Control circuit 90 responds to control signal 88 from output control unit 102 by controlling memory unit 82's memory control unit 91, PC control unit 92, shifter 93 and ALU 94 to execute an integer operation and a memory access operation. Control circuit 90 also responds to control signal 89 from output control unit 103 by controlling integer operation unit 83's multiplier 95, ALU 96 and shifter 97 to execute an integer operation.

FM decoder 101 also outputs a portion of a decode result to memory unit 82 memory control unit 91. According to the partial decode result received from FM decoder 101, memory control unit 91 determines parallel execution/consecutive execution of operation instructions and controls a timing at which a subsequent instruction code is fetched. For example, if FM decoder 101 provides a decode result indicative of consecutive execution of two operation instructions, memory control unit 91 holds for two cycles an instruction code subsequently output on the ID bus while output control units 102 and 103 are controlled, as described above. As such, output control units 102 and 103 determine whether an operation instruction field is valid for each clock cycle. If it is valid then a decode result from an instruction decoder is output on a control signal, and if it is not then a control signal is output indicative of no-operation.

Figure 8:
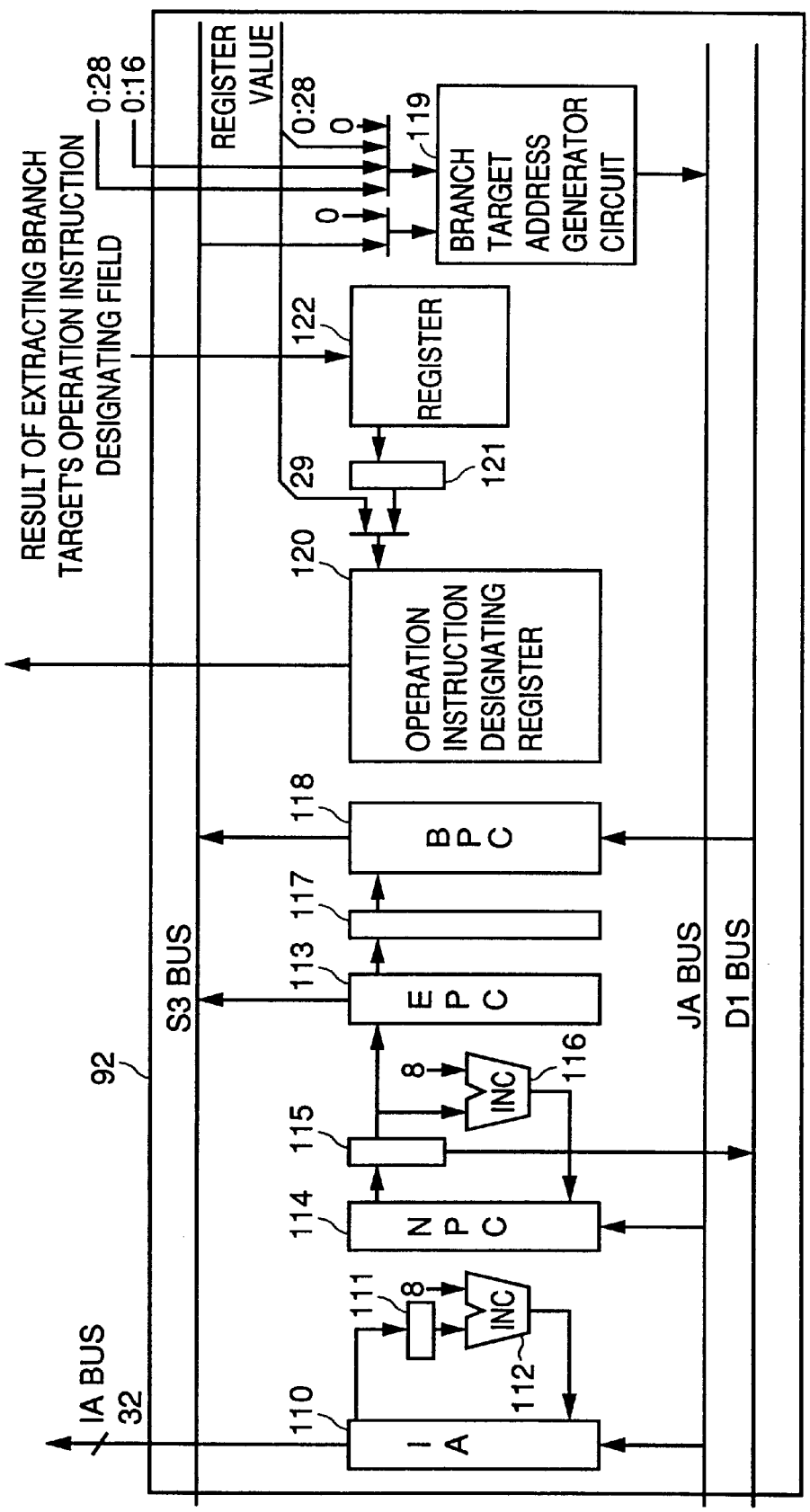
FIG. 8 is a block diagram showing a schematic configuration of a PC control unit 92.

FIG. 8 is a block diagram showing a schematic configuration of PC control unit 92. PC control unit 92 includes an instruction address (IA) register 110, an execution stage PC (EPC) 113 holding a PC value of an instruction being executed, a next-instruction PC (NPC) 114 holding a PC value of a next instruction to be executed, a back-up PC (BPC) 118 backing up a PC value, a branch target address generator circuit 119 generating an address of a branch target, an operation instruction designating register 120 outputting branch target's operation instruction designating signal 99, a register 122 holding a value of branch target's operation instruction designating field 37, incrementors 112, 116, and latches 111, 115, 117, 121.

IA register 110 holds an address of an instruction word to be subsequently fetched and outputs it via an IA bus to instruction RAM 81. If a following instruction word is subsequently fetched, incrementor 112 increments by "8" an address value of IA register 110 held by latch 111. The incremented address value is written back to IA register 110. If a branch instruction causes a sequence to be switched, IA register takes in a transferred branch target address via a JA bus.

NPC 114 holds a PC value of an instruction to be subsequently executed. When a branching is introduced in the stage of execution, NPC 114 takes in a branch target address via the JA bus. Otherwise, incrementor 116 increments by "8" an address value of NPC 114 held by latch 115 and the incremented address value is written back to NPC 114.

When the subsequent instruction enters the state of execution, EPC 113 takes in an address value of NPC 114 held by latch 115 and holds the address value as a PC value of an instruction being executed.

For a subroutine branch instruction, an address value held in latch 115 is output on the D1 bus as a return address and written in general-purpose register 84 at a link register R62. BPC 118 corresponds to CR2 (55) of control register 41, allowing an address value of EPC 113 held in latch 117 to be transferred to BPC 118 when an exception, an interruption, or the like is detected. BPC 118 also has an input port for receiving an address value on the D1 bus and an output port for outputting an address value to the S3 bus, allowing an address value of BPC 118 to be pushed or popped via general-purpose register 84.

When a branching is introduced in the stage of execution, branch target address generator circuit 119 combines two inputs depending on the addressing mode designated by the branch instruction, to calculate and output the branch target's address on the JA bus. Branch target address generator circuit 119 has two types of inputs, one receiving either the most 29 significant bits of an address value held by EPC 113 or BPC 118, or "0", the other receiving either one of the most 29 significant bits of a register value read from general-purpose register 84, displacement 36 of operation instruction field 22 (shown in FIG. 3C) extracted in instruction decode unit 80 at field extraction unit 100, field 38 of operation instruction field 23 (shown in FIG. 3D) extracted in instruction decode unit 80 at field extraction unit 100, and "0".

Branch target address generator circuit 119 extends a value of field 38 of operation instruction field 23, the most 29 significant bits of a register value read from general-purpose register 84, the most 29 significant bits of EPC 113 and the most 29 significant bits of BPC 118 with "0" at the least three significant bits before they are used for calculating a branch target address. Branch target address generator circuit 119 also extends displacement 36 of operation instruction field 22 with "0" at the least three significant bits and applies a sign extension or a zero extension to it at the most 12 significant bits before it is used for calculating a branch target address.

Register 122 takes in and holds a value of branch target's operation instruction designating field 37 that field extraction unit 100 of instruction decode unit 80 extracts from an operation instruction code of a branch instruction.

When a branching is introduced in the stage of execution, operation instruction designating register 120 takes in a value of register 122 held in latch 121. If a branch target of a branching introduced in the stage of execution is designated by indirect register addressing, operation instruction designating register 120 takes in the value of the 30th significant bit of a register value read from general-purpose register 84. The value taken in is output as branch target's operation instruction control signal 99 to instruction decode unit 80. If in the stage of execution there is not any branching or an operation executed is not a branch instruction, then "0" is taken in and output as branch target's operation instruction control signal 99 to instruction decode unit 80.

The present embodiment has been described with respect to a VLIW processor with a fixed instruction length of eight bytes which executes an instruction word including one or two operation instructions. However, the present embodiment is applicable ,e.g., to a VLIW processor having a fixed instruction length of 16 bytes which executes an instruction word including four operation instructions, if an branch instruction has branch target's operation instruction designating field 37 adapted to have two bits. Varying the bit width of branch target's operation instruction designating field 37, as described above, renders the present embodiment applicable to any VLIW processors with any number of operation instructions included in an instruction word.

As such the VLIW processor of the present embodiment can properly execute branching to any operation instruction in an instruction word and does not require an operation instruction designated as a branch target to be prepared at a boundary of an instruction word in encoding multiple operation instructions into a single VLIW instruction. Thus it is not necessary to insert into an instruction code a useless NOP instruction required for preparing an operation instruction at a boundary of an instruction word, allowing an enhanced efficiency of instruction-code compression.

Second Embodiment

In the VLIW processor of the first embodiment, NPC 114 and EPC 113 in PC control unit 92 each hold a PC value constantly corresponding to an address of a boundary of an instruction word. That is, when any from the second operation onward to be executed in a consecutive execution is being executed, NPC 114 and EPC 113 each hold a PC value equal to that when the first operation instruction is being executed.

As such, when an exception or an interruption (EIT) is detected during a consecutive execution, e.g., during the execution of the second operation instruction, the PC value of the first operation instruction is pushed in BPC 118. Thus after returning from an EIT the first operation instruction is again executed and an abnormality is thus caused in an instruction sequence. Accordingly, conventionally there has been a limitation that if a consecutive execution is provided an EIT is detected only in the fist cycle of the consecutive execution. In other words, if an EIT occurs during a consecutive execution, the EIT is not detected until the execution of the subsequent instruction word. This results in an increased latency of the EIT. The VLIW processor of the second embodiment solves such disadvantage.

The VLIW processor of the second embodiment is distinguished from that of the first embodiment only in the configuration of the instruction decode unit and that of the PC control unit. Accordingly a detailed description of the same figurations and functions will not be repeated. The instruction decode unit and the PC control unit of the present embodiment will be denoted by reference characters 80a and 92a, respectively.

Figure 9:
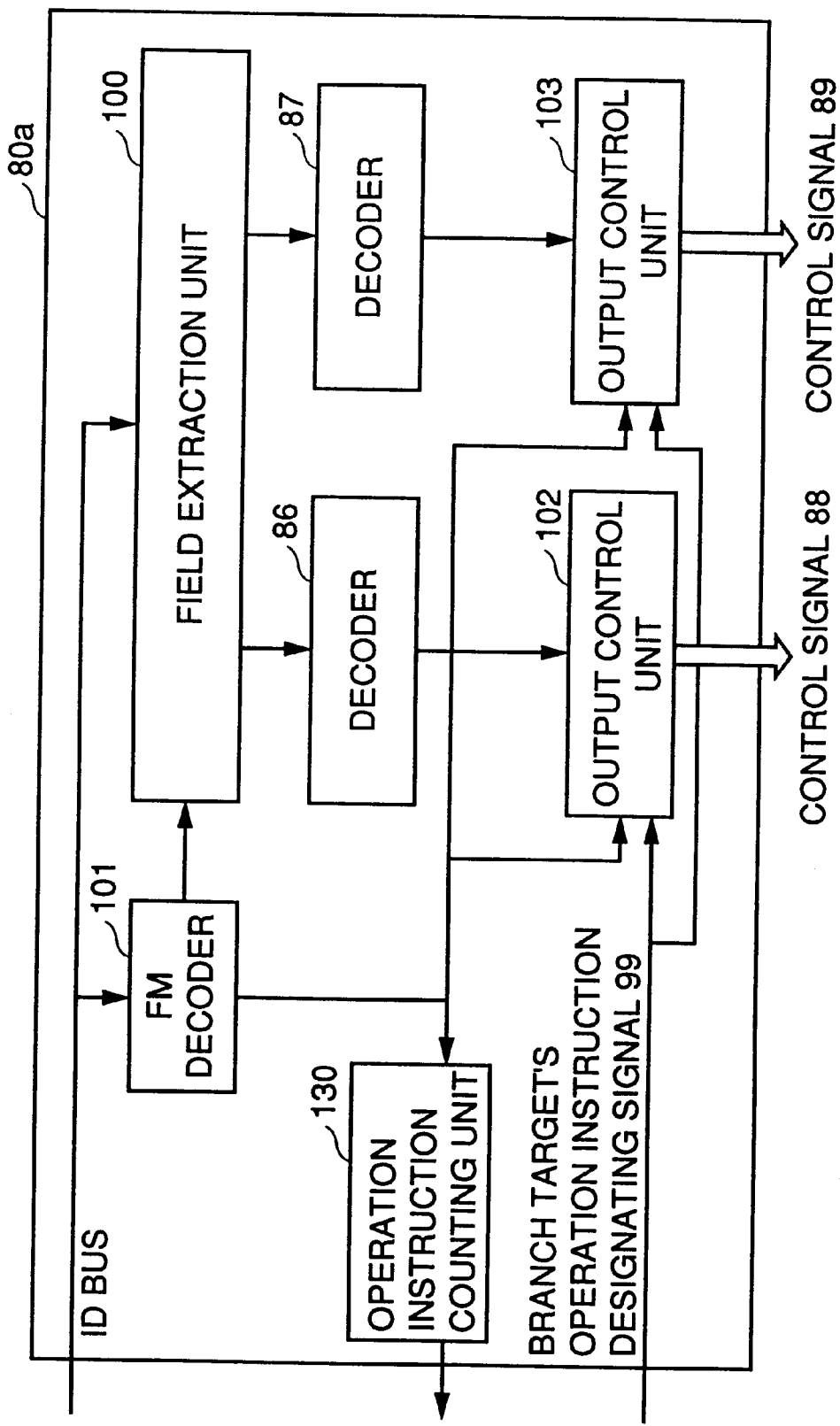
FIG. 9 is a block diagram showing a schematic configuration of an instruction decode unit 80a in a VLIW processor of a second embodiment of the present invention.

FIG. 9 is a block diagram for illustrating a schematic configuration of instruction decode unit 80a of the VLIW processor of the present embodiment. Instruction decode unit 80a is the FIG. 7 instruction decode unit 80 plus an operation instruction counting unit 130. Accordingly a detailed description of the same figurations and functions will not be repeated.

When FM decoder 101 provides a decode result indicative of a consecutive execution, operation instruction counting unit 130 counts the number of operation instructions having been executed during the consecutive execution. Operation instruction counting unit 130 has its count value reset to "0" for each new instruction fetched. Only when FM decoder 101 provides a decode result indicative of a consecutive execution, operation instruction counting unit 130 increments by "1" for each operation instruction decoded. The value counted by operation instruction counting unit 130 is output to memory unit 82 to be used in pushing and popping a PC value in processing an exception.

Figure 10:
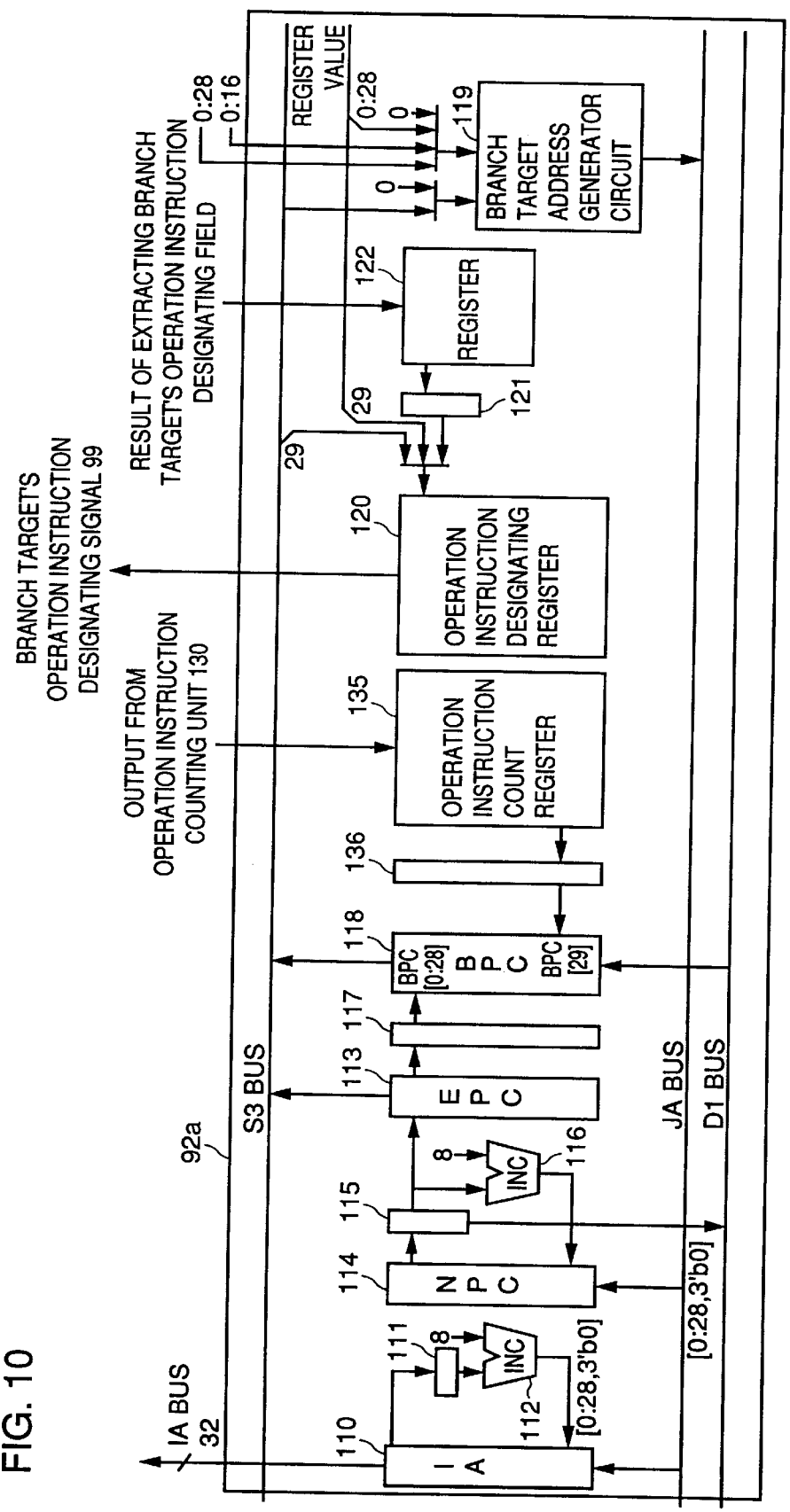
FIG. 10 is a block diagram showing a schematic configuration of a PC control unit 92a in a VLIW processor of the second embodiment of the present invention.

FIG. 10 is a block diagram for illustrating a schematic configuration of PC control unit 92a of the VLIW processor of the present embodiment. PC control unit 92a is distinguished from the FIG. 8 PC control unit 92 only in that an operation instruction count register 135 and a latch 136 are added for holding a value counted by operation instruction counting unit 130 and that a path to take in the value of the 30th significant bit of BPC 118 is added to an input selecting path to operation instruction designating register 120. Accordingly a detailed description of the same figurations and functions will not be repeated.

Operation instruction count register 135 takes in a value counted by operation instruction counting unit 130 and notifies BPC 118 which operation instruction the currently executed operation instruction is in the execution order of the operation instructions of the consecutive execution of interest. BPC 118 corresponds to CR2 (55) of control register 41, and when an EIT is detected the most 29 significant bits of EPC 113 held by latch 117 are taken into the most 29 significant bits of BPC 118 and a value of operation instruction count register 135 held by latch 136 is taken into the 30th significant bit of BPC 118. Furthermore the PBC's least two significant bits are constantly "0". Thus BPC 118 can hold the address of an operation instruction being executed when an EIT is detected. In returning from an EIT, the values of the most 29 significant bits of BPC 118 are sent via branch target address generator circuit 119 to IA 110 and NPC 114 and the value of the 30th significant bit of BPC 118 is taken into operation instruction designating register 120.

BPC 118 also has an input port for receiving an address value via the D1 bus and an output port for outputting an address value via the S3 bus to push and pop a BPC value to and from the general-purpose register, as required.

When a subroutine branch instruction is executed in the VLIW processor of the present embodiment, as a return address the most 29 significant bits of a PC value held in latch 115 are output to the most 29 significant bits of the D1 bus and a value held by operation instruction counting unit 130 is output to the 30th most significant bit of the D1 bus and written in general-purpose register 84 at link register R62. Thus a subroutine branch instruction can be executed during a consecutive execution, allowing an enhanced efficiency of instruction-code compression.

The present embodiment has been described with respect to a VLIW processor with a fixed instruction length of eight bytes which executes an instruction word including one or two operation instructions. However, the present embodiment is also applicable ,e.g., to a VLIW processor having a fixed instruction length of four bytes which executes an instruction word including one or two operation instructions. More specifically, the present embodiment is applicable to a VLIW processor if the most 30 significant bits of EPC 113 are taken into the most 30 significant bits of BPC 118 and a value of operation instruction count register 135 is taken into the 31st significant bit of BPC 118.

As described above, since the VLIW processor of the present embodiment allows BPC 118 to hold an address for each operation instruction an EIT can be accepted during a consecutive execution to reduce the EIT's latency. Furthermore, writing an address to a link register for each operation instruction allows a subroutine branch instruction to be executed during a consecutive execution and an instruction-code compression efficiency to be enhanced.

Third Embodiment

When an instruction word includes two short-type operation instructions between which there is no data interference or conflict between operation units, the VLIW processor of the first embodiment can execute the two operation instructions in parallel. Furthermore, if the two operation instructions are executable in either one of two operation units (memory unit 82 and integer operation unit 83), the two operation instructions can be placed in either one of operation instruction fields 12 and 13.

However, if one of two operation instructions is designated as a branch target, the two operation instructions are limited in order of execution and can thus not be executed in parallel. More specifically, if the first operation instruction to be executed that is designated as a branch target is placed in operation instruction field 13 and a branch instruction capable of branching to any operation instruction is executed to execute branching to the operation instruction in operation instruction field 13, then the second operation instruction to be executed that is placed in operation instruction field 12 is not executed and an abnormality is introduced in an instruction sequence. Thus, unless an operation instruction designated as a branch target of a branch instruction is no-operation, it must be executed consecutively. In other words, branching to the operation instruction in operation instruction field 13 must not be executed in an instruction word designated to be executed in parallel.

However, an error introduced in preparing a program can result in a branch target being erroneously designated and as a result, branching to the operation instruction of operation instruction field 13 can be executed in an instruction word designated to be executed in parallel, or for a single operation instruction a branch instruction designating operation instruction field 13 can be executed although operation instruction field 13 does not exist. The VLIW processor of the third embodiment overcomes such disadvantage.

The VLIW processor of the third embodiment is distinguished from that of the first embodiment only in the configuration of the instruction decode unit. Accordingly a detailed description of the same configurations and functions will not be repeated. The instruction decode unit of the present embodiment is denoted by a reference character 80b.

Figure 11:
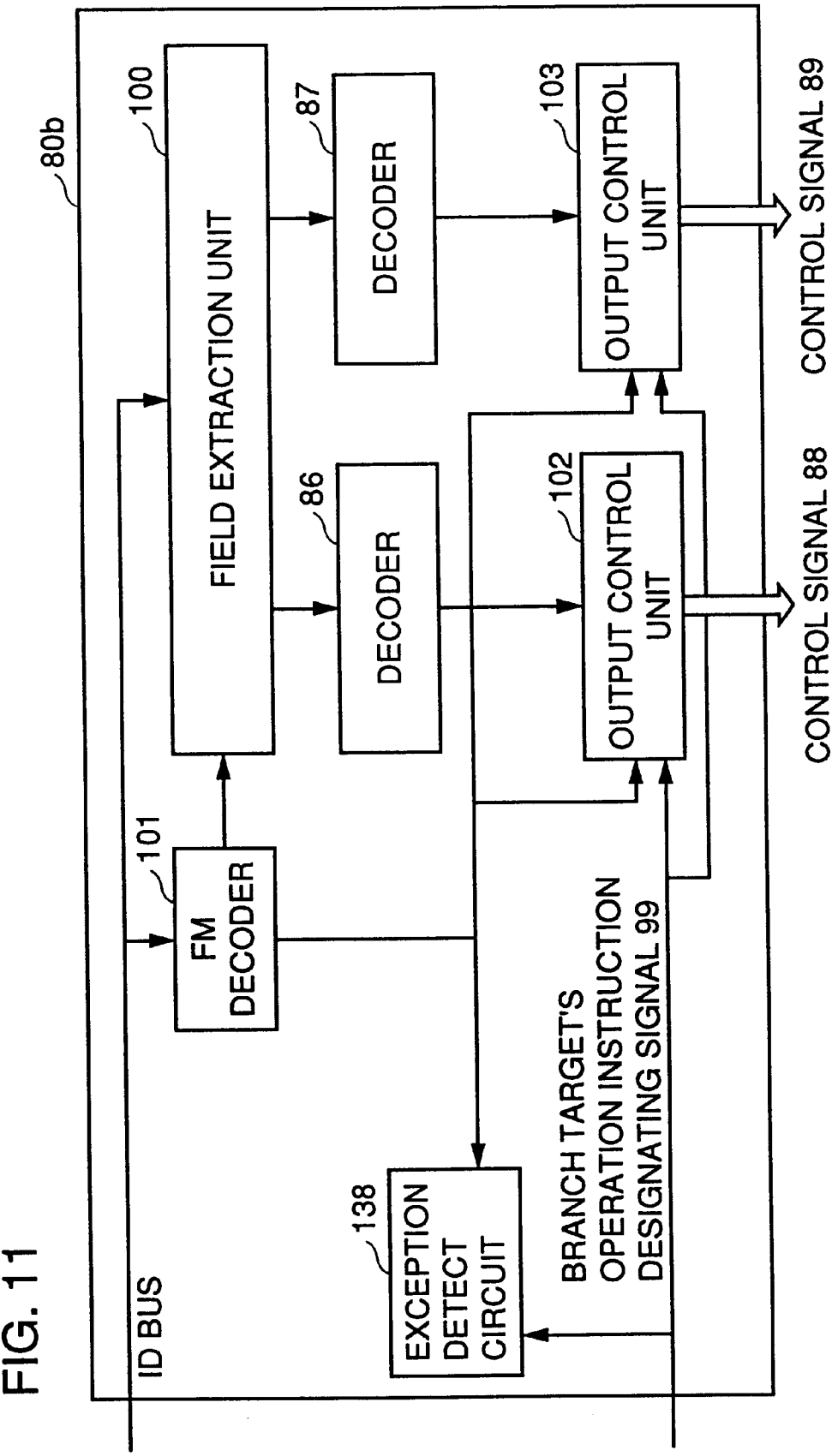
FIG. 11 is a block diagram showing a schematic configuration of an instruction decode unit 80b in a VLIW processor of a third embodiment of the present invention.

FIG. 11 is a block diagram for illustrating a schematic configuration of instruction decode unit 80b of the VLIW processor of the present embodiment. Instruction decode unit 80b is the FIG. 7 instruction decode unit 80 plus an exception detection circuit 138. Accordingly a detailed description of the same configurations and functions will not be repeated.

Exception detection circuit 138 receives a decode result provided by FM decoder 101 and branch target's operation instruction designating signal 99, and provides an exception when FM decoder 101 provides an output of "00" (parallel execution) or "11" (a single operation instruction) and branch target's operation instruction designating signal 99 also has a value of "1".

The present embodiment has been described with respect to a VLIW processor with a fixed instruction length of eight bytes which executes an instruction word including one or two operation instructions. However, the present embodiment is also applicable ,e.g., to a VLIW processor having a fixed instruction length of 16 bytes which executes an instruction word including four operation instructions. More specifically, the present embodiment is applicable if branch target's operation instruction designating field 37 is adapted to have two bits and the exception detection circuit has its configuration varied accordingly.

As described above, the VLIW processor of the present embodiment can provide an exception when branching to the operation instruction of operation instruction field 13 is executed in an instruction word designated to be executed in parallel or for a single operation instruction a branch instruction designating operation instruction field 13 is executed although operation instruction field 13 does not exist. Thus a programmer can interrupt a sequence of a program to debug the program to thus facilitate development of software.

Fourth Embodiment

When the VLIW processor of the first embodiment executes branching to any but the first operation instruction to be executed in the consecutive execution, the first operation instruction to be executed is internally converted to no-operation and it is, together with the operation instruction of the branch target, executed consecutively. This, however, requires two cycles for executing the instruction word of the branch target and thus disadvantageously results in a slower execution time. The VLIW processor of the fourth embodiment overcomes such disadvantage.

The VLIW processor of the fourth embodiment is distinguished from that of the first embodiment only in the configuration of the instruction decode unit. Accordingly a detailed description of the same configurations and functions will not be repeated. The instruction decode unit of the present embodiment is denoted by a reference character 80c.

Figure 12:
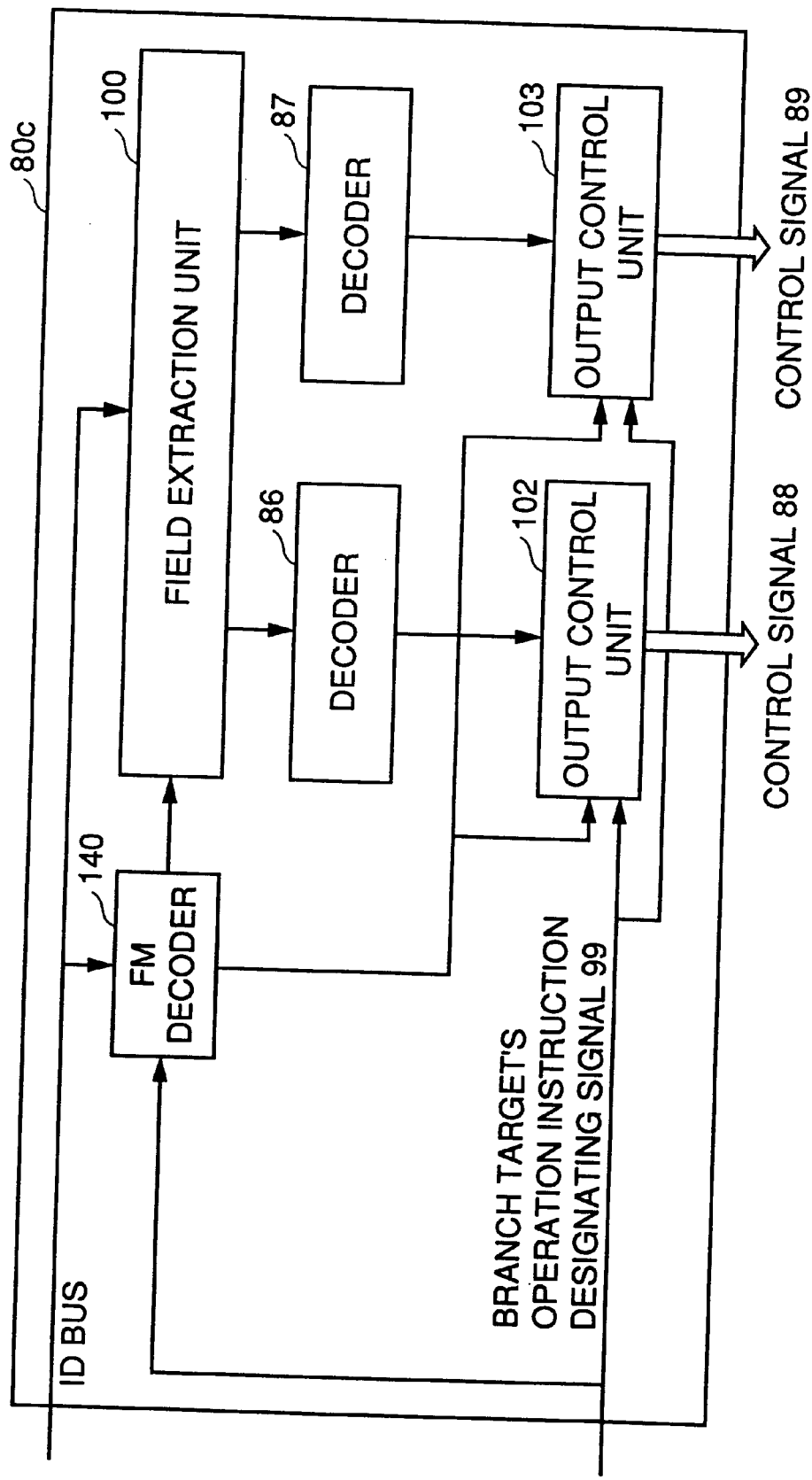
FIG. 12 is a block diagram showing a schematic configuration of an instruction decode unit 80c in a VLIW processor of a fourth embodiment of the present invention.

FIG. 12 is a block diagram for illustrating a schematic configuration of instruction decode unit 80c of the VLIW processor of the present embodiment. Instruction decode unit 80c is distinguished from the FIG. 7 instruction decode unit 80 only in that an FM decoder 140 receives branch target's operation instruction designating signal 99 and that the FM decoder functions differently. Accordingly a detailed description of the same configurations and functions will not be repeated. The FM decoder of the present embodiment is denoted by a reference character 140.

FM decoder 140 decodes format fields 10 and 11 values and branch target's operation instruction designating signal 99 value, and distinguishes between operation instruction field 1 for double operation instructions shown in FIG. 1A and operation instruction field 2 for a single operation instruction shown in FIG. 1B and also designates an execution order of operation instructions.

FIG. 13 is a diagram for representing a content of a process for a decode result from FM decoder 140. FM decoder 140 decodes the three bits of two bits from format fields 10 and 11 and one bit from branch target's operation instruction designating signal 99 to output eight types of decode results. In FIG. 13, "FM" indicates the two bits of format fields 10 and 11, "1ops" indicates a single operation instruction, "2ops" indicates double operation instructions, "1st" indicates that the operation with the indication is the first operation to be executed, and "2nd" indicates that the operation with the indication is the second operation to be executed. Furthermore, "—" indicates that the operation with the indication does not exist.

Format fields 10, 11 have the same meaning as described with reference to FIG. 2. When branch target's operation instruction designating signal 99 is "0", FM decoder 140 provides the same decode result as the FIG. 2 FM decoder 101. When branch target's operation instruction designating signal 99 is "1" or branching to the second operation instruction to be executed in a consecutive execution is executed, FM decoder 140 provides a decode result indicative of parallel execution of double operation instructions.

Assume there is an instruction word with format fields 10 and 11 having a value of "01", operation instruction field 12 designating a memory access operation in memory unit 82, and operation instruction field 13 designating an integer operation in integer operation unit 83 and that an instruction to branch to the integer operation in the instruction word has been executed. FM decoder 140 decodes format fields 10, 11, and branch target's operation instruction designating signal 99 and outputs to output control units 102 and 103 a decode result indicative of a parallel execution. Since FM decoder 140 outputs a decode result of a parallel execution, instruction decoders 86 and 87 simultaneously output their respective decode results. Since branch target's operation instruction designating signal 99 is "1", output control unit 102 ignores a result of decoding an operation instruction executed prior to an operation instruction of the branch target (a decode result of the first operation instruction to be executed in a consecutive execution) and outputs control signal 88 indicative of no-operation. Output control unit 103 receives from instruction decoder 87 a result of decoding an integer operation instruction and outputs the result on control signal 89.

The present embodiment has been described with respect to a VLIW processor with a fixed instruction length of eight bytes which executes an instruction word including one or two operation instructions. However, the present embodiment is also applicable ,e.g., to a VLIW processor having a fixed instruction length of 16 bytes which executes an instruction word including four operation instructions. More specifically, the present embodiment is applicable if branch target's operation instruction designating field 37 is adapted to have two bits and the FM decoder has its configuration varied accordingly.

As described above, the VLIW processor of the present embodiment is adapted to allow a decode result to be provided indicative of a parallel execution of double operation instructions when branching to the second operation instruction to be executed in a consecutive execution is executed. Thus an instruction word of a branch target can be executed in a single cycle, resulting in an enhanced efficiency of instruction-code compression and a reduced instruction execution cycle.

Fifth Embodiment

Figure 14:
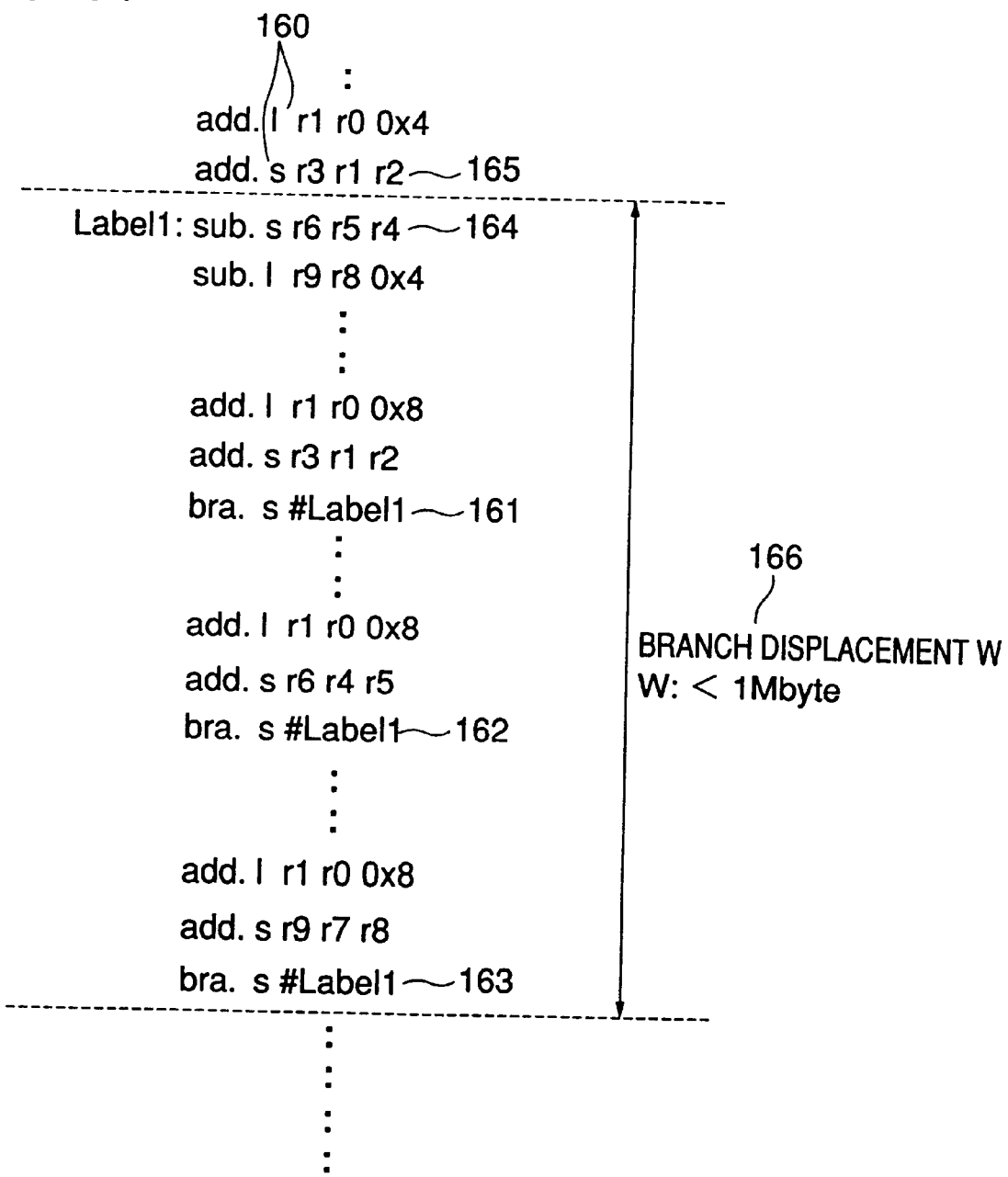
FIG. 14 represents an exemplary program described in an assembly language.

FIG. 14 is an exemplary program described in an assembly language. This program represents an operation instruction before it is encoded into the operation instruction formats shown in FIGS. 1A and 1B. In the FIG. 14 program, "s" and "l" following an addition instruction "add.", a subtraction instruction "sub.", or a branch instruction "bra." represent a short-type operation instruction format and a long-type operation instruction format, respectively.

Description will now be made of encoding the FIG. 14 program so that a conventional VLIW processor can execute it. FIG. 15 represents the program after it is encoded, with a branch displacement W of no more than 1 Mbyte. "∥" denoted by a reference character 170 represents a parallel execution. Because of the three branch operation instructions 161, 162 and 163 shown in FIG. 14, an operation instruction 164 designated as a branch target must be prepared at a boundary of an instruction word. Thus operation instructions 164 and 165 cannot be encoded in a single instruction word, and excessive NOP instructions 171 and 172 are inserted, as shown in FIG. 15.

Figure 16:
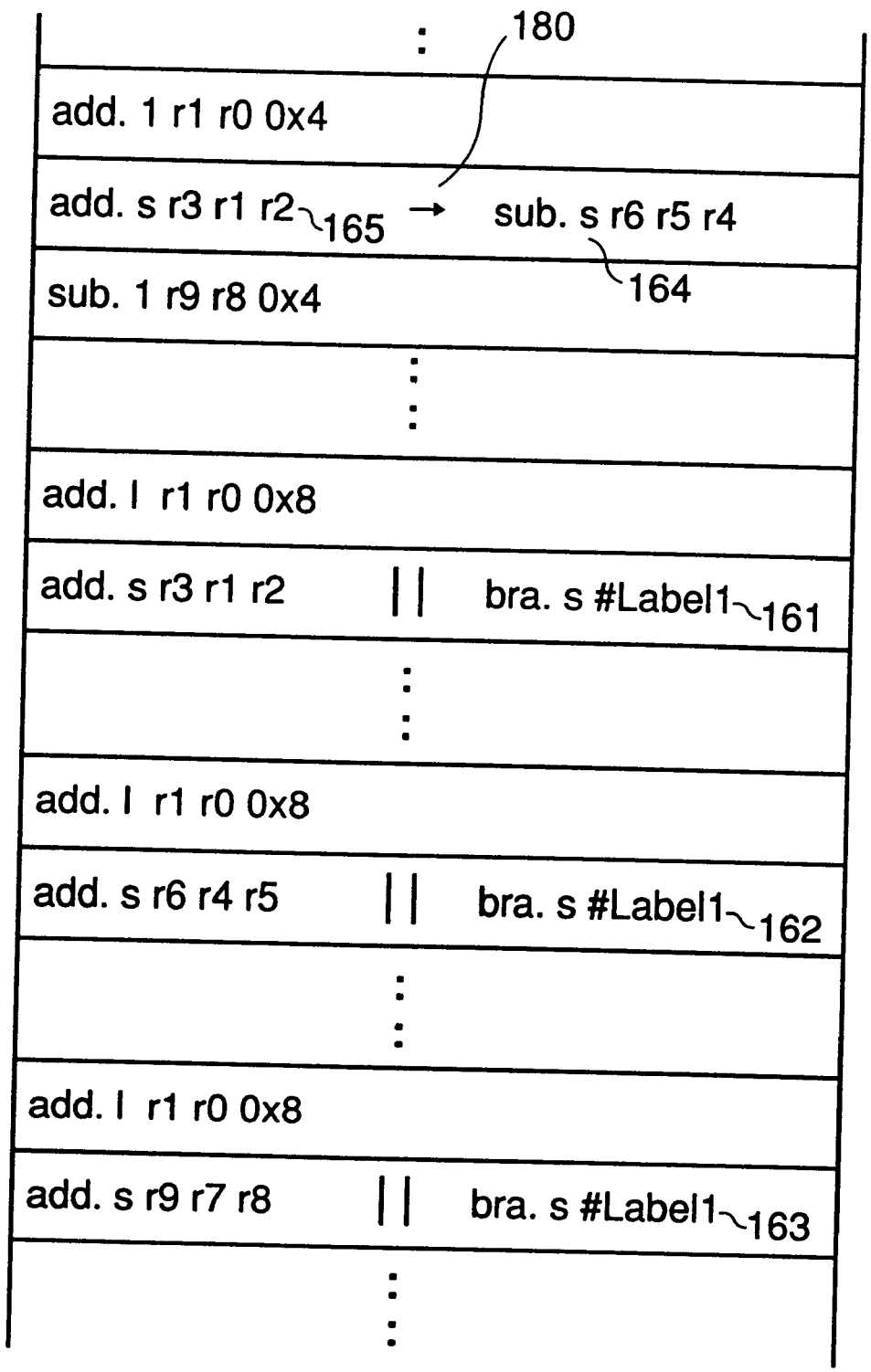
FIG. 16 represents a program after it is encoded so that the VLIW processor of the first embodiment can execute it, with branch displacement W of no more than 1 Mbyte.

If the FIG. 14 program is encoded so that the VLIW processor of the first embodiment can execute it, it is not necessary to prepare at an instruction-word boundary an operation instruction designated as a branch target and operation instructions 164 and 165 can thus be encoded into a single instruction word, as shown in FIG. 16. In FIG. 16, "→" denoted by a reference character 180 represents a consecutive execution. As compared to FIG. 15, it is not necessary to insert two NOP instructions 171 and 172. Thus two operation-instruction regions can be reduced to provide an enhanced instruction coding efficiency.

However, the VLIW processor of the first embodiment can only execute a branch instruction which allows a branch displacement of at most 1 Mbyte to be designated. Thus if a branch displacement is larger than 1 Mbyte and no larger than 2 Mbytes then the FIG. 14 branch instructions 161, 162, 163 are not allowed to designate operation instruction 164 as a branch target. Accordingly, branch instructions 161, 162, 163 must be changed to those of a long-type operation instruction format allowing a branch target to be designated with an absolute address.

Figure 17:
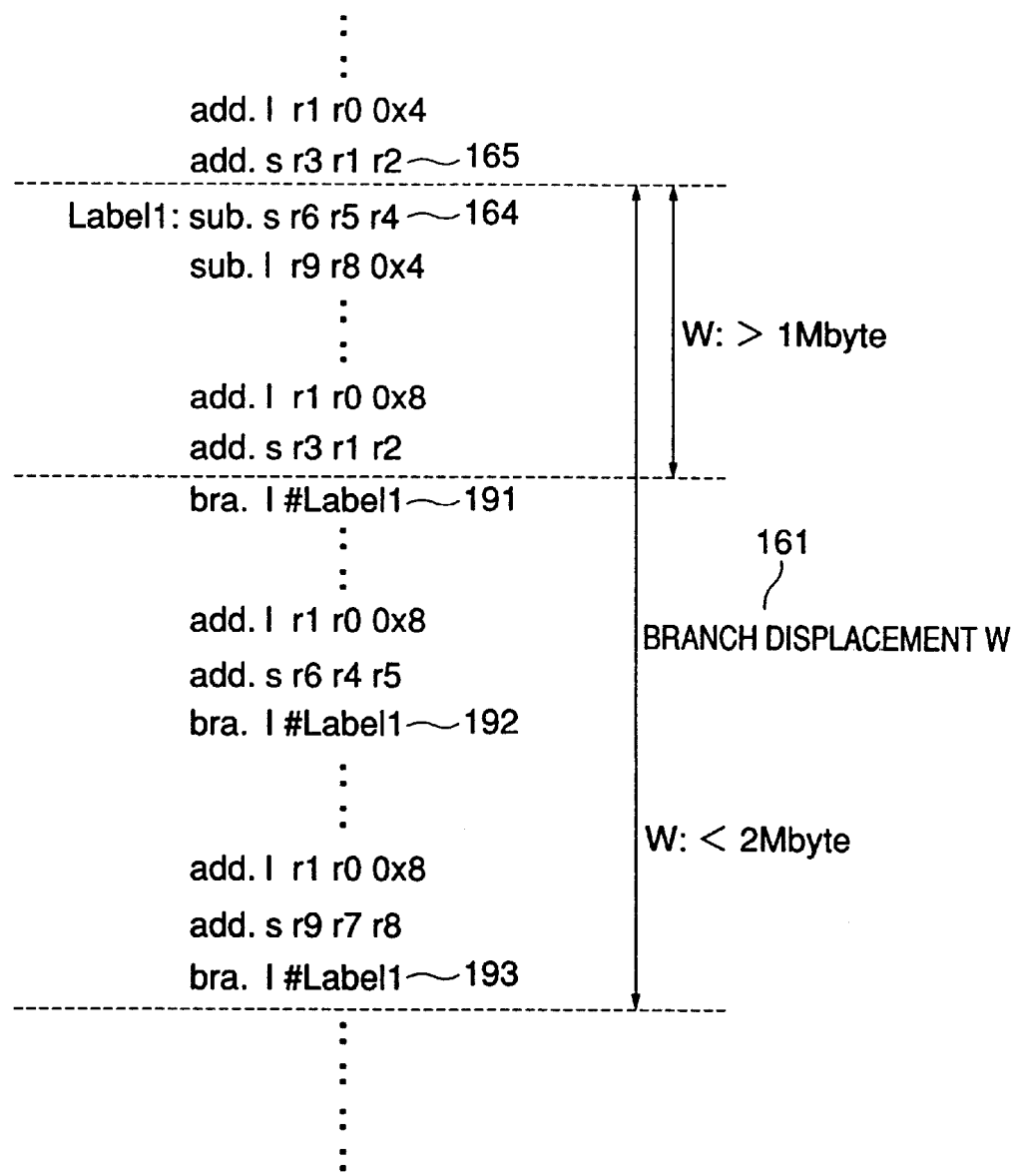
FIG. 17 represents a program after a branch instruction is changed from a short-type operation instruction format to a long-type operation instruction format.

FIG. 17 represents a program after branch instructions 161, 162, 163 of a short-type operation instruction format are converted to branch instructions 191, 192, 193 of a long-type operation instruction format. In order for the VLIW processor of the first embodiment to execute it, the FIG. 17 program is encoded to produce the FIG. 18 program. With branch instructions 191, 192, 193, an operation instruction can be designated as a branch target and operation instructions 164 an 165 can thus be encoded into a single instruction word. Thus, when the portion of a branch target is only noted, this program can be smaller in the number of operation-instruction regions by two than a program executed by a conventional VLIW processor. However, since the exact branch instructions have been changed in format from a short-type operation instruction format to a long-type operation instruction format, a total of six operation-instruction regions are increased and as a whole the program has four more operation-instruction regions than that executed by the conventional VLIW processor, resulting in a poor efficiency of instruction-code compression.

A VLIW processor provided with a branch instruction providing for branching at any operation instruction, such as the VLIW processor of the first embodiment, but not provided with a branch instruction providing for branching at any instruction word, can suffer a lower efficiency of instruction-code compression in a program executed thereby when such a specific branching as described above is performed than a conventional VLIW processor. A VLIW processor of the fifth embodiment overcomes such disadvantage.

The VLIW processor of the fifth embodiment of the present invention is identical in configuration to that of the first embodiment and a detailed description thereof will thus not be repeated.

FIGS. 19A and 19B are diagrams for illustrating a branch instruction of a short-type operation instruction format executed by the VLIW processor of the fifth embodiment of the present invention. FIG. 19A shows an operation instruction format 150 of a branch instruction allowing an operation instruction to be designated as a branch target, including a field 30 designating an operation content, a displacement field 36 of 17 bits in length, and a branch target's operation instruction designating field 37 designating when an operation instruction of a branch target is executed according to the execution order of the instructions in the instruction word of interest. It should be noted that this operation instruction format is identical to the FIG. 3C operation instruction format 22. FIG. 19B shows an operation instruction format 151 of a branch instruction allowing an instruction word to be designated as a branch target, including a field 30 designating an operation content and a displacement field 152 of 18 bits in length.

The VLIW processor of the present embodiment is provided with an instruction length of eight bytes and an instruction address thus constantly has the least three significant bits of "0". Thus operation instruction format 150 designating an operation instruction as a branch target allows an address space of 17+3=20 bits, i.e., a branch displacement up to 1 Mbyte to be designated. Furthermore, operation instruction format 151 designating an instruction word as a branch target allows an address space of 18+3=21 bits, i.e., a branch displacement up to 2 Mbytes to be designated.

The present embodiment has been described with respect to a VLIW processor with a fixed instruction length of eight bytes executing an instruction word including one or two operation instructions. It is only different in that two types of branch instructions allow different branch displacements to be designated, and is thus applicable to a VLIW processor with a varied instruction length and a different number of operation instructions included in an instruction word.

As has been described above, the VLIW processor of the present embodiment is adapted to execute a branch instruction allowing an operation instruction to be designated as a branch target and a branch instruction allowing an instruction word to be designated as a branch target. Thus, by appropriately using the two types of operation instructions via software such as a compiler, an enhanced efficiency of instruction-code compression can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A VLIW processor executing consecutively or in parallel a plurality of operation instructions included in a single instruction word, comprising:

instruction decode means for selecting one of parallel execution and consecutive execution, and decoding the plurality of operation instructions included in the instruction word; and execution means for executing said plurality of operation instructions based on the result of decoding said plurality of operation instructions provided by said instruction decode means, said execution means including program counter control means for controlling a value of a program counter and providing an indication for said instruction decode means to provide as no-operation an operation instruction provided in the instruction word including a branch target operation instruction and executed prior to the branch target operation instruction when branching to said branch target operation instruction in the instruction word set to be executed in the consecutive execution is introduced.

2. The VLIW processor according to claim 1, said execution means executing a branch instruction in another instruction word causing the branching, said another instruction word including a branch target's operation instruction designating field designating when an operation instruction of a branch target is executed according to an execution order of operation instructions in the instruction word, wherein said program counter control means includes an operation instruction designating register holding a value of said branch target's operation instruction designating field.

3. The VLIW processor according to claim 2, said instruction word also including a format field designating an operation-instruction executing order and a plurality of operation-instruction fields, wherein said instruction decode means includes:
a format field decoder decoding said format field;
field extraction means for extracting a field included in said instruction word;
a plurality of instruction decoders decoding the plurality of operation-instruction fields extracted by said field extraction means; and
a plurality of output control means for controlling an output of a decode result provided by said plurality of instruction decoders, using a decode result from said format field decoder and the value held in said operation instruction designating register.

4. The VLIW processor according to claim 3, wherein when the value held in said operation instruction designating register indicates branching to said branch target operation instruction in the instruction word set to be executed in a consecutive execution, said plurality of output control means provide and output as no-operation an operation instruction provided in the instruction word and executed prior to said branch target operation instruction in the instruction word set to be executed in the consecutive execution.

5. The VLIW processor according to claim 3, wherein said instruction decode means further includes exception detecting means for detecting an exception, depending on the decode result provided from said format field decoder and the value held in said operation instruction designating register.

6. The VLIW processor according to claim 5, wherein said exception detecting means detects an exception when said format field decoder provides a decode result indicative of one of a parallel execution and a single operation instruction and the value held in said operation instruction designating register also indicates that the operation instruction of the branch target is any but an operation instruction to be firstly executed in an instruction word of interest.

7. The VLIW processor according to claim 3, wherein said format field decoder decodes a value held in said format field and that held in said branch target's operation instruction designating field to determine an execution order of said plurality of operation instructions included in said instruction word.

8. The VLIW processor according to claim 1, wherein:
said instruction decode means includes operation instruction counting means for counting a number of operation instructions executed in a consecutive execution; and
said program counter control means includes a back-up program counter using the number of operation instructions counted by said operation instruction counting means to produce and push a program counter value when one of an exception and an interruption occurs.

9. The VLIW processor according to claim 1, wherein said instruction decode means decodes plural types of branch instructions, and
said execution means executes branches dependent on the plural types of branch instructions with respective branch displacements, and
wherein maximum amounts of the branch displacements capable of being specified by the plural types of branch instructions are different.

10. A VLIW processor executing consecutively or in parallel a plurality of operation instructions included in a single instruction word and executing a branch instruction in another single instruction word having a branch target's operation instruction designating field specifying which of the plurality of operation instructions in said instruction word is a branch target operation instruction of the branch instruction, comprising an instruction decode unit, a memory unit and an integer operation unit, wherein:
said instruction word includes a plurality of operation instruction fields, a format field;
said memory unit includes an operation instruction designating register receiving said branch target's operation instruction designating field;
said instruction decode unit includes
a format field decoder receiving said format field,
a plurality of instruction decoders receiving said plurality of operation instruction fields, respectively, and
a plurality of output control units receiving a decode result from said format field decoder, a value of said operation instruction designating register and a decode result from each said instruction decoders, and connected to one of said memory unit and said integer operation unit.

11. The VLIW processor according to claim 10, wherein said plurality of output control units provide and output as no-operation an operation instruction provided in the instruction word and executed prior to the branch target operation instruction in the instruction word set to be executed in a consecutive execution manner.

12. The VLIW processor according to claim 10, wherein:
said instruction decode unit further includes an operation instruction counting unit counting a number of an operation instructions executed in a consecutive execution; and
said memory unit includes a back-up program counter using the number of operation instructions counted by said operation instruction counting unit to produce and push a program counter value when one of an exception and an interruption occurs.

13. The VLIW processor according to claim 10, wherein said instruction decode unit further includes an exception detect circuit detecting an exception, depending on the decode result provided from said format field decoder and the value held in said operation instruction designating register.

14. The VLIW processor according to claim 13, wherein said exception detect circuit detects an exception when said format field decoder provides a decode result indicative of one of a parallel execution and a single operation instruction and the value held in said operation instruction designating register also indicates that an operation instruction of a branch target is any but an operation instruction to be firstly executed in an instruction word of interest.

15. The VLIW processor according to claim 10, wherein said format field decoder decodes a value held in said format field and that held in said branch target's operation instruction designating field to determine an execution order of said plurality of operation instructions included in said instruction word.

16. The VLIW processor according to claim 10, wherein branches dependent on plural types of branch instructions specifying respective branch displacements are executed, and maximum amounts of the branch displacements specified by the plural types of branch instructions are different.

* * * * *